United States Patent
Shimomura

(10) Patent No.: US 11,435,564 B2
(45) Date of Patent: Sep. 6, 2022

(54) ZOOM LENS AND IMAGE PICKUP APPARATUS

(71) Applicant: CANON KABUSHIKI KAISHA, Tokyo (JP)

(72) Inventor: Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 16/988,124

(22) Filed: Aug. 7, 2020

(65) Prior Publication Data

US 2021/0048655 A1    Feb. 18, 2021

(30) Foreign Application Priority Data

Aug. 16, 2019   (JP) ............................. JP2019-149309

(51) Int. Cl.
| | | |
|---|---|---|
| G02B 15/14 | (2006.01) | |
| G02B 15/20 | (2006.01) | |
| G02B 27/00 | (2006.01) | |
| G02B 15/167 | (2006.01) | |
| G02B 15/24 | (2006.01) | |

(52) U.S. Cl.
CPC ..... *G02B 15/145125* (2019.08); *G02B 15/20* (2013.01); *G02B 27/0025* (2013.01); *G02B 15/1461* (2019.08); *G02B 15/167* (2013.01); *G02B 15/24* (2013.01)

(58) Field of Classification Search
CPC .... G02B 15/145125; G02B 15/144113; G02B 15/1461; G02B 15/167; G02B 15/22; G02B 15/24; G02B 27/0025; G02B 27/0075

USPC .................. 359/683, 764, 757, 759, 760
See application file for complete search history.

(56) References Cited

U.S. PATENT DOCUMENTS

| | | |
|---|---|---|
| 9,264,638 B2 | 2/2016 | Nakamura et al. |
| 9,268,120 B2 | 2/2016 | Shimomura et al. |
| 9,310,592 B2 | 4/2016 | Wakazono et al. |
| 9,329,372 B2 | 5/2016 | Shimomura |
| 9,400,374 B2 | 7/2016 | Yoshimi et al. |
| 9,678,318 B2 | 6/2017 | Nakamura et al. |
| 9,716,829 B2 | 7/2017 | Shimomura |
| 9,904,043 B2 | 2/2018 | Shimomura et al. |
| 10,295,806 B2 | 5/2019 | Miyazawa et al. |
| 10,670,845 B2 | 6/2020 | Shimomura |

(Continued)

FOREIGN PATENT DOCUMENTS

| | | |
|---|---|---|
| JP | 2016-173481 A | 9/2016 |
| JP | 2018-132731 A | 8/2018 |

*Primary Examiner* — Kristina M Deherrera
(74) *Attorney, Agent, or Firm* — Carter, DeLuca & Farrell LLP

(57) ABSTRACT

Provided is a zoom lens including, in order from an object side: a positive first unit not moving for zooming; one or two moving units move for zooming and including a negative unit; a negative unit moving for zooming; a positive unit including a stop and moving for zooming; and a positive final unit not moving for zooming. The distances on the optical axis, from surface, closest to the object side, of the first unit to a surface, closest to an image side, of the first unit, from the surface, closest to the object side, of the first unit to the stop at the wide angle end, from the surface, closest to the image side, of the first unit to the stop at the wide angle end, and the maximum distance from the surface, closest to the image side, of the first unit to the stop are appropriately set.

13 Claims, 20 Drawing Sheets

(56) References Cited

U.S. PATENT DOCUMENTS

| | | | |
|---|---|---|---|
| 2018/0239119 A1* | 8/2018 | Shimada | G02B 15/167 |
| 2019/0064478 A1* | 2/2019 | Shimada | G02B 13/06 |
| 2019/0265447 A1 | 8/2019 | Hori et al. | |
| 2019/0265448 A1 | 8/2019 | Ogawa et al. | |
| 2019/0265451 A1 | 8/2019 | Shimomura et al. | |
| 2020/0310085 A1* | 10/2020 | Tanaka | G02B 27/005 |
| 2020/0310086 A1* | 10/2020 | Tanaka | G02B 15/145129 |
| 2020/0310090 A1* | 10/2020 | Tanaka | G02B 15/20 |

* cited by examiner

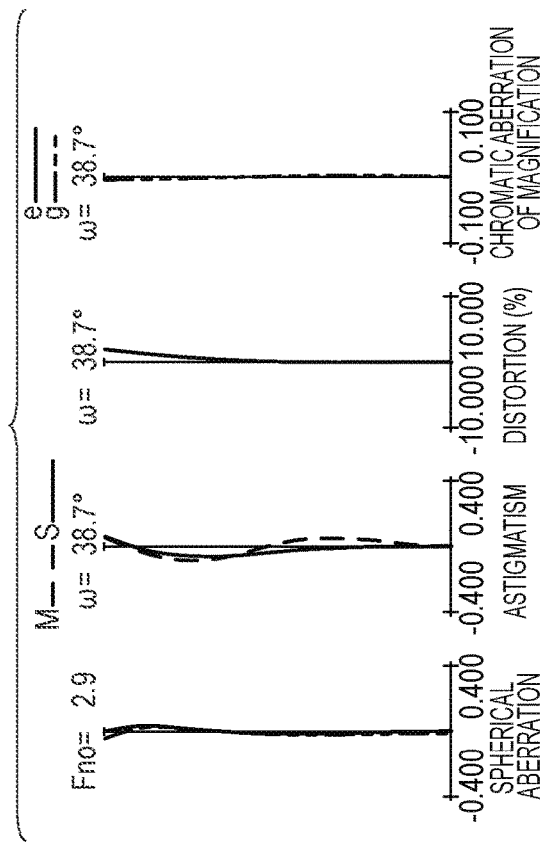
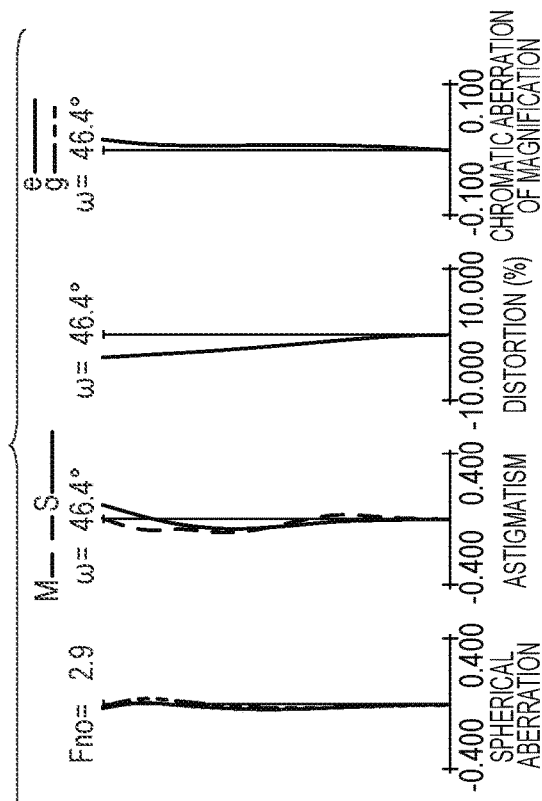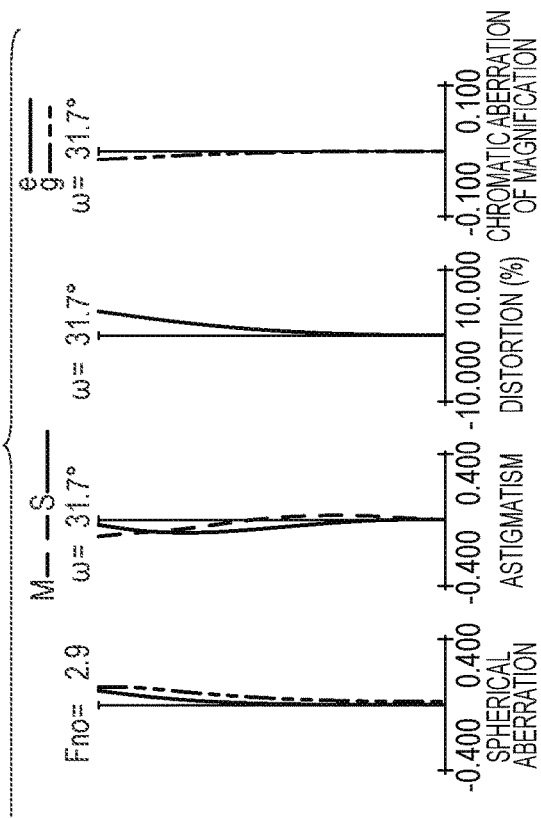

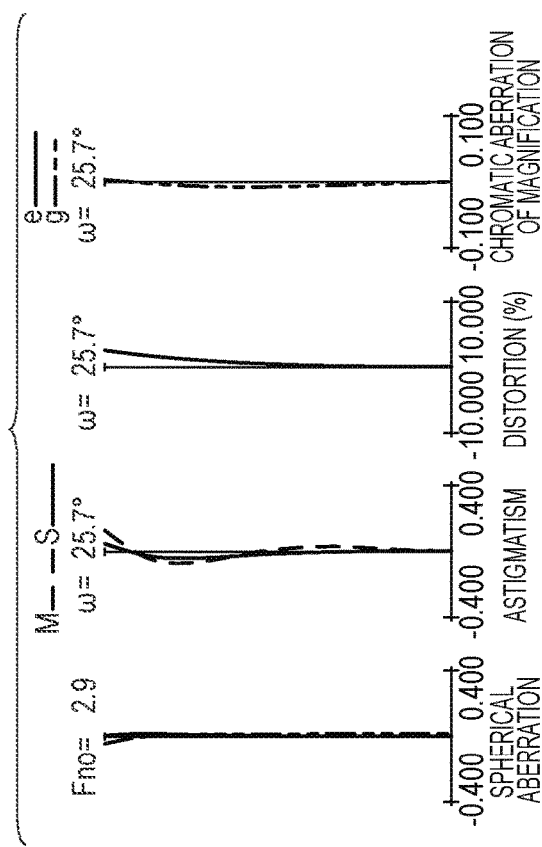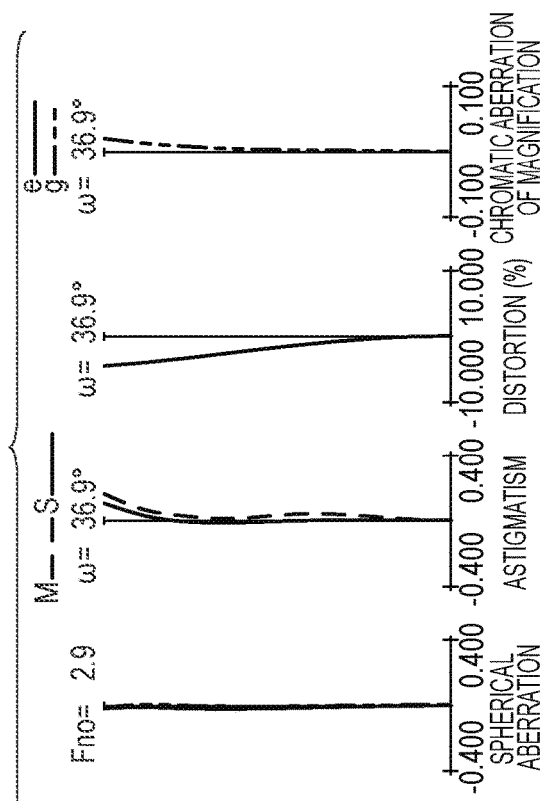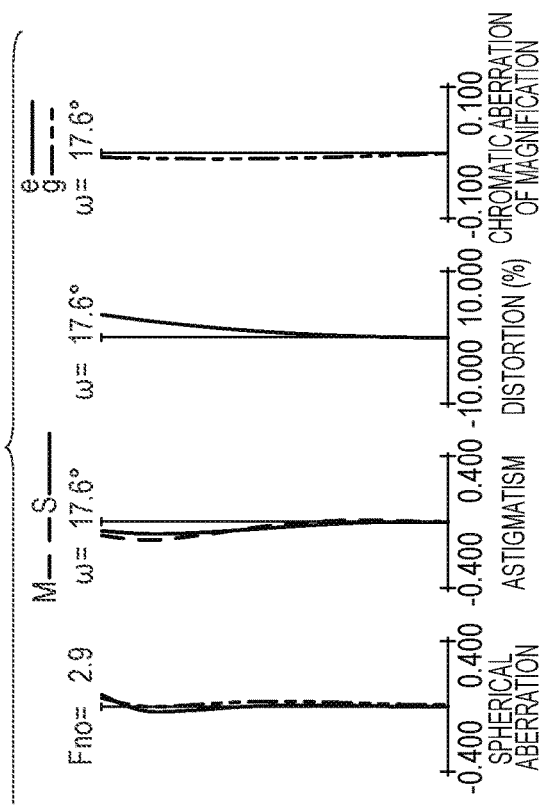

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, there has been a demand for a zoom lens having a wide angle of view, a high zoom ratio, and high optical performance for image pickup apparatuses such as television cameras, cameras for filming, and cameras for photography. In particular, image pickup devices such as CCDs and CMOSs used in cameras for television and filming being professional video shooting systems have substantially uniform resolution over the entire image pickup area. For this reason, the zoom lenses using these image pickup devices are required to be such that the resolution is substantially uniform from the center of the screen to the edge of the screen.

As a zoom lens having a wide angle of view and a high zoom ratio, a positive lead type zoom lens has been known in which a first lens unit having a positive refractive power is disposed closest to the object side. For example, Japanese Patent Application Laid-Open No. 2016-173481 discloses a zoom lens with a zoom ratio of about 7 which includes, in order from the object side, a first lens unit having a positive refractive power, a second lens unit to a fifth lens unit configured to move for zooming, and a sixth lens unit, and the fifth lens unit includes an aperture stop. Also, Japanese Patent Application Laid-Open No. 2018-132731 discloses a zoom lens with a zoom ratio of about 22 which includes a first lens unit having a positive refractive power, a second lens unit to a fourth lens unit configured to move for zooming, and a fifth lens unit, and the fourth lens unit includes an aperture stop.

For the positive lead type zoom lenses with the above-described configurations to have all of high optical performance, a wide angle of view, and a small size, it is important to appropriately set the arrangement of the aperture stop and the focal length of each lens unit. If a wider angle of view is to be achieved, the zoom lenses will be larger in size since the lens diameter of the first lens unit is determined by an off-axial light at the wide angle end. Also, it will be necessary to shorten the focal length of the first lens unit. Accordingly, it will be difficult to achieve high optical performance from the center of the image plane to the edge of the image plane.

In the zoom lens disclosed in Japanese Patent Application Laid-Open No. 2016-173481, the amount of movement of the lens unit including the aperture stop is small. If a wider angle of view is to be achieved, the lens diameter of the first lens unit will be large. Also, in the zoom lens disclosed in Japanese Patent Application Laid-Open No. 2018-132731, the lens unit including the aperture stop takes such a path as to get closest to the object side at an intermediate point in zooming. This is a disadvantage in achieving a wider angle of view.

SUMMARY OF THE INVENTION

An aspect of embodiments provides, for example, a zoom lens beneficial in a wide angle of view, a small size and weight, and high optical performance over an entire zoom range.

An aspect of embodiments provides a zoom lens including in order from an object side to an image side: a first lens unit having a positive refractive power and configured not to move for zooming; one or two moving lens units including a lens unit having a negative refractive power, the one or two moving lens units being configured to move for zooming; a negative lens unit configured to move for zooming; a positive lens unit including an aperture stop and configured to move for zooming; and a final lens unit having a positive refractive power and configured not to move for zooming, in which an interval between each pair of neighboring ones of lens units changes for zooming, and following conditional expressions are satisfied:

$$0.4 < L1/LSP < 0.9; \text{ and}$$

$$1.1 < Lspmax/Lspw < 1.8,$$

where L1 is a distance on an optical axis from a surface, closest to the object side, of the first lens unit to a surface, closest to an image side, of the first lens unit, LSP is a distance on the optical axis from the surface, closest to the object side, of the first lens unit to the aperture stop at a wide angle end, Lspw is a distance on the optical axis from the surface, closest to the image side, of the first lens unit to the aperture stop at the wide angle end, and Lspmax is a maximum value of a distance on the optical axis from the surface, closest to the image side, of the first lens unit to the aperture stop.

Further features of the present invention will become apparent from the following description of exemplary embodiments with reference to the attached drawings.

BRIEF DESCRIPTION OF THE DRAWINGS

FIG. 6A is a set of aberration diagrams of the zoom lens in Numerical Embodiment 3 in a case of focusing at infinity at the wide angle end.

FIG. 6B is a set of aberration diagrams of the zoom lens in Numerical Embodiment 3 in a case of focusing at infinity at f=27 mm.

FIG. 6C is a set of aberration diagrams of the zoom lens in Numerical Embodiment 3 in a case of focusing at infinity at the telephoto end.

FIG. 8A is a set of aberration diagrams of the zoom lens in Numerical Embodiment 4 in a case of focusing at infinity at the wide angle end.

FIG. 8B is a set of aberration diagrams of the zoom lens in Numerical Embodiment 4 in a case of focusing at infinity at f=45 mm.

FIG. 8C is a set of aberration diagrams of the zoom lens in Numerical Embodiment 4 in a case of focusing at infinity at the telephoto end.

DESCRIPTION OF THE EMBODIMENTS

Preferred embodiments of the present invention will be described in detail below with reference to the accompanying drawings.

Firstly, characteristic features of a zoom lens of the present invention will be described with conditional expressions. For the zoom lens of the present invention to be a zoom lens having a wide angle of view, a small size and weight, and high optical performance across the entire zoom range, the position of the its aperture stop and the length of its first lens unit are specified. Specifically, the present invention can provide a small and light zoom lens with high optical performance whose angle of view is about 60 to 100 degrees at the wide angle end and whose zoom ratio is about 1.5 to 15.

The zoom lens of the present invention includes, in order from the object side to the image side: a first lens unit having a positive refractive power and configured not to move for zooming; one or two moving lens units including a lens unit having a negative refractive power, the one or two moving lens units being configured to move for zooming; a negative lens unit configured to move for zooming; a positive lens unit including an aperture stop and configured to move for zooming; and a final lens unit having a positive refractive power and configured not to move for zooming. The interval between each pair of neighboring ones of the lens units changes for zooming. The following conditional expressions are satisfied:

$$0.4 < L1/LSP < 0.9 \tag{1; and}$$

$$1.1 < Lspmax/Lspw < 1.8 \tag{2},$$

where L1 is the distance on the optical axis from the closest surface of the first lens unit to the object to the closest surface of the first lens unit to the image, LSP is the distance on the optical axis from the closest surface of the first lens unit to the object to the aperture stop at the wide angle end, Lspw is the distance on the optical axis from the closest surface of the first lens unit to the image side to the aperture stop at the wide angle end, and Lspmax is the maximum value of the distance on the optical axis from the closest surface of the first lens unit to the image side to the aperture stop during zooming.

Figure 19A:
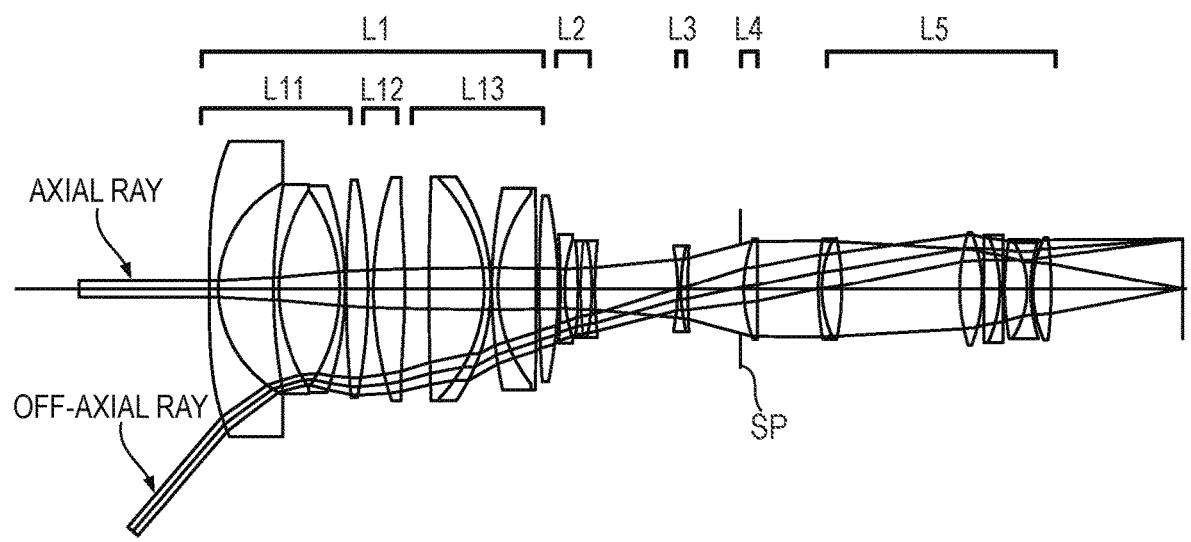
FIG. 19A is an optical path diagram of the zoom lens in Numerical Embodiment 1 in a case of focusing at an object distance of infinity at the wide angle end.
Figure 19B:
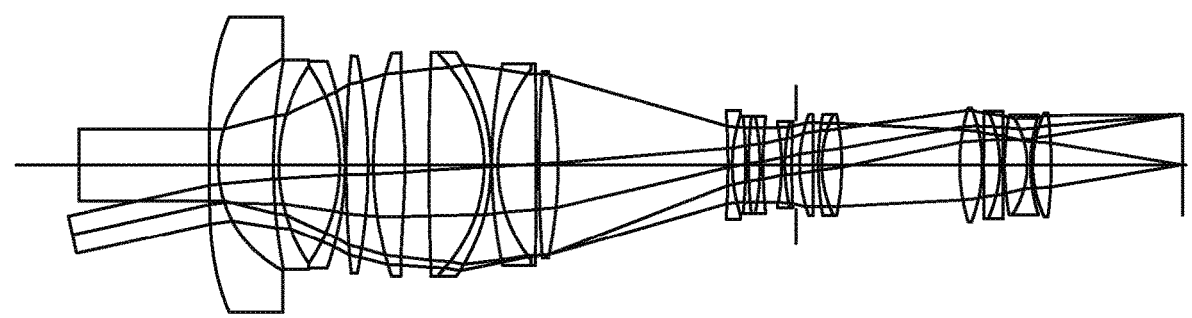
FIG. 19B is an optical path diagram of the zoom lens in Numerical Embodiment 1 in a case of focusing at an object distance of infinity at the telephoto end.

The optical effect achieved by employing the above configuration for the first lens unit of the present invention will be described. FIGS. 19A and 19B illustrate optical path diagrams of a zoom lens in Numerical Embodiment 1 focused at an object distance of infinity at the wide angle end and the telephoto end, respectively. As can be seen from FIGS. 19A and 19B, the lens diameter of the first sub lens unit having the largest lens diameter in the first lens unit is determined by an off-axial light at an object distance of infinity at the wide angle end. For this reason, attempting to further widen the angle of view tends to increase the lens diameter of the first sub lens unit. To address this, in the present invention, the path for the positive lens unit including the aperture stop is set such that the positive lens unit is disposed closer to the object at the wide angle end. In this way, the entrance pupil in the zoom lens at the wide angle end is pushed toward the object side. This suppresses the increase in the lens diameter of the first sub lens unit resulting from the widening of the angle of view.

Also, the conditional expression (1) specifies the ratio of the interval from the closest surface of the first lens unit to the object to the closest surface of the first lens unit to the image, and the interval from the closest surface of the first lens unit to the object to the aperture stop at the wide angle end. By satisfying the conditional expression (1), the zoom lens is reduced in size. If the upper limit condition in the conditional expression (1) is not satisfied, the thickness of the first lens unit will be large. Accordingly, the lens diameter of the first lens unit will be large, thus making it difficult to reduce the size of the zoom lens. If, on the other hand, the lower limit condition in the conditional expression (1) is not satisfied, the interval from the first lens unit to the aperture stop at the wide angle end will be large. Accordingly, the above-mentioned effect of pushing the entrance pupil toward to the object side will be low, thus making it difficult to reduce the size of the zoom lens.

The conditional expression (2) specifies the ratio of the interval from the final surface of the first lens unit to the aperture stop at the wide angle end, and the maximum value of the interval from the final surface of the first lens unit to the aperture stop during zooming. By satisfying the conditional expression (2), the zoom lens achieves both a size reduction and high optical performance. If the upper limit in the conditional expression (2) is not satisfied, the amount of movement of the positive lens unit with the aperture stop during zooming will be large, thus making it difficult to correct the field curvature and the chromatic aberration of magnification particularly at an intermediate zoom point. If, on the other hand, the lower limit in the conditional expression (2) is not satisfied, the interval from the first lens unit to the aperture stop at the wide angle end will be large. Accordingly, the above-mentioned effect of pushing the entrance pupil toward to the object side will be low, thus making it difficult to reduce the size of the zoom lens.

More preferably, the conditional expressions (1) and (2) are set as below.

$$0.45 < L1/LSP < 0.80 \quad (1a)$$

$$1.15 < Lspmax/Lspw < 1.65 \quad (2a)$$

A further form of the zoom lens of the present invention is characterized in that the first lens unit has a negative first sub lens unit and a positive second sub lens unit in order from the object side to the image side, and has a positive sub lens unit on the image side relative to the second sub lens unit, and that at least the second sub lens unit moves during focusing. The interval between each pair of neighboring ones of the sub lens units changes for focusing. Since a negative lens unit is disposed on the object side of the first lens unit and positive lens units are disposed on the image side of the first lens unit, the image-side principal point of the first lens unit can be easily set on the image side. Thus, the configuration is advantageous in widening the angle of view.

A further form of the zoom lens of the present invention is such that the following conditional expression is satisfied:

$$|1/\beta p| < 0.2 \quad (3),$$

where $\beta p$ is the lateral magnification of the positive lens unit at the wide angle end when the zoom lens receives a light from infinity. By satisfying the conditional expression (3), light exiting the positive lens unit is close to parallel. Accordingly, the change in aperture diameter during zooming is small. If the condition in the conditional expression (3) is not satisfied, light exiting the positive lens unit will be angled. Accordingly, the change in aperture diameter during zooming will be large.

More preferably, the conditional expression (3) is set as below.

$$|1/\beta p| < 0.15 \quad (3a)$$

A further form of the zoom lens of the present invention is such that the following conditional expression is satisfied:

$$1.05 < Lspt/Lspw < 1.75 \quad (4),$$

where Lspt is the interval from the final surface of the first lens unit to the aperture stop at the telephoto end. By satisfying the conditional expression (4), the zoom lens achieves both a size reduction and high optical performance. If the upper limit in the conditional expression (4) is not satisfied, the amount of movement of the positive lens unit with the aperture stop during zooming will be large, thus making it difficult to correct the field curvature and the chromatic aberration of magnification particularly at an intermediate zoom point. If, on the other hand, the lower limit in the conditional expression (4) is not satisfied, the interval from the first lens unit to the aperture stop at the wide angle end will be large. Accordingly, the above-mentioned effect of pushing the entrance pupil toward to the object side will be low, thus making it difficult to reduce the size of the zoom lens.

More preferably, the conditional expression (4) is set as below.

$$1.10 < Lspt/Lspw < 1.65 \quad (4a)$$

A further form of the zoom lens of the present invention is such that the following conditional expression is satisfied:

$$-1.5 < fp/fn < -0.1 \quad (5),$$

where fp and fn are the focal lengths of the positive lens unit and the negative lens unit, respectively. By satisfying the conditional expression (5), the zoom lens is reduced in size. If the upper limit condition in the conditional expression (5) is not satisfied, the refractive power of the positive lens unit will be low. Accordingly, the lens diameters of the subsequent lens units will be large, thus making it difficult to reduce the size of the zoom lens. If, on the other hand, the lower limit in the conditional expression (5) is not satisfied, the refractive power of the negative lens unit will be low. Accordingly, the amount of movement of the negative lens unit during zooming will be large, thus making it difficult to reduce the size of the zoom lens.

More preferably, the expression (5) is set as below.

$$-1.30 < fp/fn < -0.15 \qquad (5a)$$

A further form of the zoom lens of the present invention is such that the following conditional expression is satisfied:

$$-6.0 < f1/fm < -0.8 \qquad (6),$$

where f1 and fm are the focal length of the first lens unit and the combined focal length of the moving lens units at the wide angle end, respectively. By satisfying the conditional expression (6), the zoom lens achieves both a size reduction and high optical performance. The focal length of the zoom lens is a value obtained by multiplying the focal length of the first lens unit by the lateral magnification of the moving lens units and the subsequent lens units. Thus, in order to widen the angle of view, it is necessary to appropriately set the focal length of the first lens unit. If the upper limit in the conditional expression (6) is not satisfied, the refractive power of the first lens unit will be high, thus making it difficult to correct the aberration variation. Also, the refractive power of the second lens unit will be insufficient relative to the first lens unit. This is a disadvantage in reducing the size and weight of the zoom lens. If, on the other hand, the lower limit in the conditional expression (6) is not satisfied, the refractive power of the first lens unit will be insufficient, thus making it difficult to widen the angle of view and reduce the size and weight.

More preferably, the conditional expression (6) is set as below.

$$-5.0 < f1/fm < -0.9 \qquad (6a)$$

A further form of the zoom lens of the present invention is such that the following conditional expression is satisfied:

$$0.15 < Mmax/L1 < 1.00 \qquad (7),$$

where Mmax is the maximum value of the amount of movement of the moving lens units during zooming from the wide angle end to the telephoto end. If the upper limit in the conditional expression (7) is not satisfied, the amount of movement of the moving lens units during zooming will be large, thus making it difficult to reduce the size of the zoom lens. If, on the other hand, the lower limit in the conditional expression (7) is not satisfied, the amount of movement of the moving lens units during zooming will be small, thus making it difficult to obtain a high zoom ratio.

More preferably, the conditional expression (7) is set as below.

$$0.2 < Mmax/L1 < 0.9 \qquad (7a)$$

Further, an image pickup apparatus of the present invention is characterized in that the image pickup apparatus includes: a zoom lens in any one of the Embodiments; and an image pickup element having a predetermined effective image pickup area for receiving an image formed by the zoom lens.

Hereinbelow, specific configurations of the zoom lens of the present invention will be described based on the characteristic features of lens configurations in Numerical Embodiments 1 to 9 corresponding to Embodiments 1 to 9.

Embodiment 1

Figure 1:
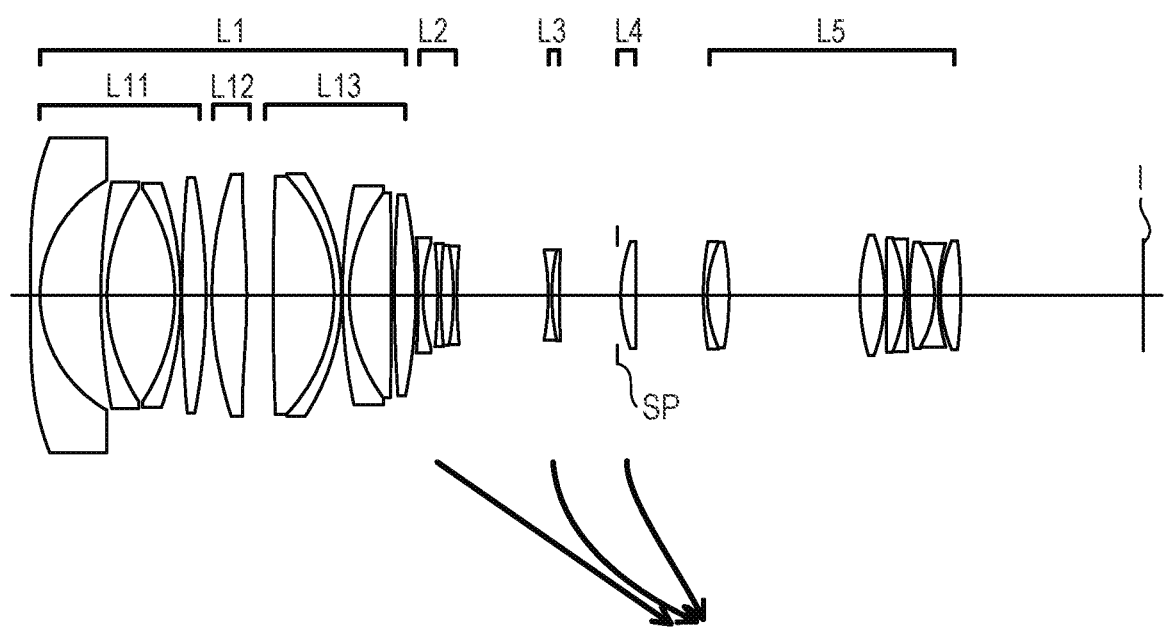
FIG. 1 is a lens cross-sectional view of a zoom lens in Numerical Embodiment 1 in a case of focusing at infinity at the wide angle end.
Figure 2A:
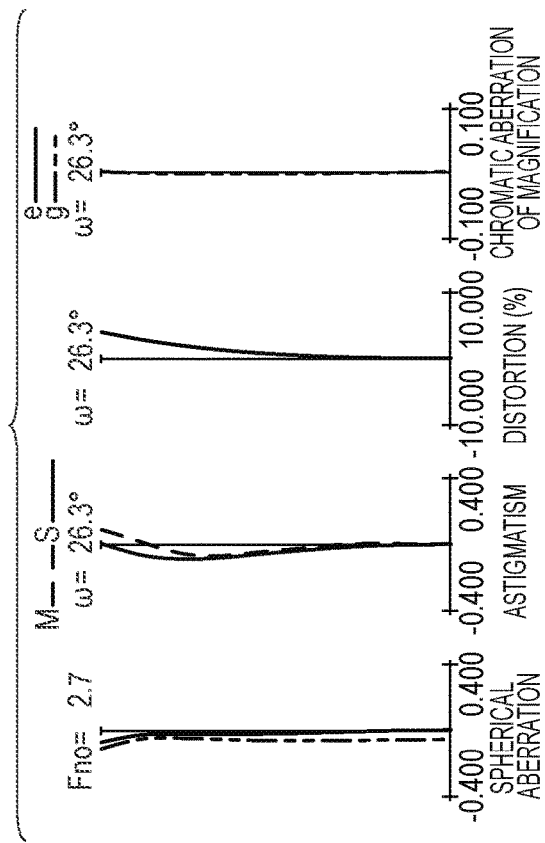
FIG. 2A is a set of aberration diagrams of the zoom lens in Numerical Embodiment 1 in a case of focusing at infinity at the wide angle end.
Figure 2B:
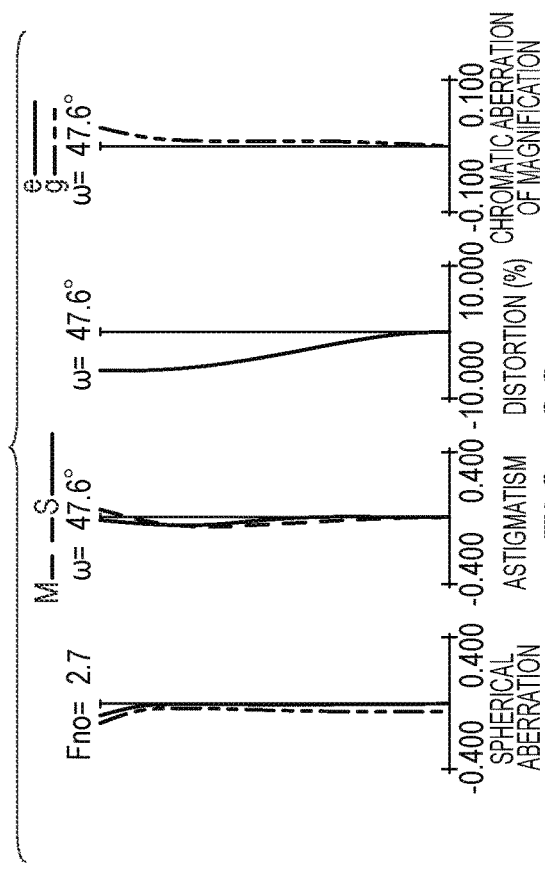
FIG. 2B is a set of aberration diagrams of the zoom lens in Numerical Embodiment 1 in a case of focusing at infinity at f=30 mm.
Figure 2C:
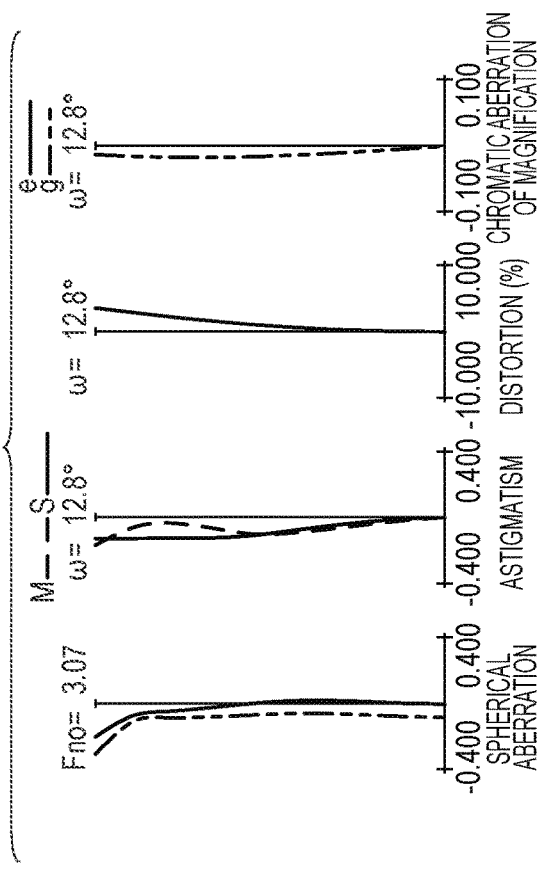
FIG. 2C is a set of aberration diagrams of the zoom lens in Numerical Embodiment 1 in a case of focusing at infinity at the telephoto end.

FIG. 1 is a lens cross-sectional view of a zoom lens as Embodiment 1 (Numerical Embodiment 1) of the present invention in a case of focusing at infinity at the wide angle end. FIGS. 2A, 2B, and 2C are sets of longitudinal aberration diagrams at the wide angle end, a focal length of 30 mm, and the telephoto end in Numerical Embodiment 1, respectively. Each of the aberration diagrams is a longitudinal aberration diagram at infinity focus. Also, the value of the focal length is a value in the later-described Numerical Embodiment expressed in units of mm. This also applies to all of the subsequent Numerical Embodiments.

In FIG. 1, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5.

In the Embodiment, the second lens unit L2, the third lens unit L3, and the fourth lens unit L4 constitute a zooming system. SP denotes an aperture stop, which is included in the fourth lens unit L4 and disposed on the closest side of the fourth lens unit to the object side. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

In the longitudinal aberration diagrams, the solid line and the two-dot chain line in the spherical aberration represent the e-line and the g-line, respectively. The dotted line and the solid line in the astigmatism represent the meridional image plane and the sagittal image plane, respectively, and the two-dot chain line in the chromatic aberration of magnification represents the g-line. ω denotes the half angle of view, and Fno denotes the F-number. In the longitudinal aberration diagrams, the spherical aberration, astigmatism, distortion, and chromatic aberration of magnification are illustrated on 0.4-mm, 0.4-mm, 10%, and 0.1-mm scales, respectively. Note that the wide angle end and the telephoto end in the following Embodiments refer to such zoom positions that the second lens unit L2 for zooming is positioned at the opposite ends of the range on the optical axis within which the second lens unit L2 is movable relative to the mechanism.

The first lens unit L1 corresponds to the 1st to 18th surfaces. The second lens unit L2 corresponds to the 19th to 24th surfaces, the third lens unit L3 corresponds to the 25th to 27th surfaces, and the fourth lens unit L4 corresponds to the 28th to 30th surfaces. The fifth lens unit L5 corresponds to the 31st to 43rd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing. The first sub lens unit L11 corresponds to the 1st to 8th surfaces, the second sub lens unit L12 corresponds to the 9th and 10th surfaces, and the third sub lens unit L13 corresponds to the 11th to 18th surfaces. In the Embodiment, a maximum value Lspmax of the interval from the final surface of the first lens unit to the aperture stop corresponds to the interval at the telephoto end.

Numerical Embodiment 1 corresponding to Embodiment 1 described above will be described. In not only Numerical Embodiment 1 but also all the Numerical Embodiments, i denotes the sequential position of a surface (optical surface) from the object side, ri denotes the curvature radius of the i-th surface from the object side, and di denotes the interval (on the optical axis) between the i-th surface from the object side and the i+1-th surface. Also, reference signs ndi and vdi respectively denote the refractive index and Abbe number of the medium (optical material) between the i-th surface and the i+1-th surface, and BF denotes the air-equivalent back focus. The shape of each aspheric surface is expressed by the equation below, where an X axis is in the direction of the optical axis, an H axis is in a direction perpendicular to the optical axis, the direction in which light advances is a positive direction, R is the paraxial curvature radius, k is the conic constant, and A3 to A16 are aspherical coefficients. Also, "e-Z" means "×10$^{-z}$".

$$X = \frac{H^2/R}{1+\sqrt{1-(1+k)(H/R)^2}} + A4H^4 + A6H^6 + A8H^8 + \\ A10H^{10} + A12H^{12} + A14H^{14} + A16H^{16} + A3H^3 + \\ A5H^5 + A7H^7 + A9H^9 + A11H^{11} + A13H^{13} + A15H^{15}$$ [Math. 1]

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range. Meanwhile, it is essential for the zoom lens of the present invention to satisfy the conditional expressions (1) and (2) but the zoom lens of the present invention does not necessarily have to satisfy the conditional expressions (3) to (7). However, satisfying at least one of the conditional expressions (3) to (7) can bring about a better advantageous effect. This applies to the other Embodiments as well.

Figure 20:
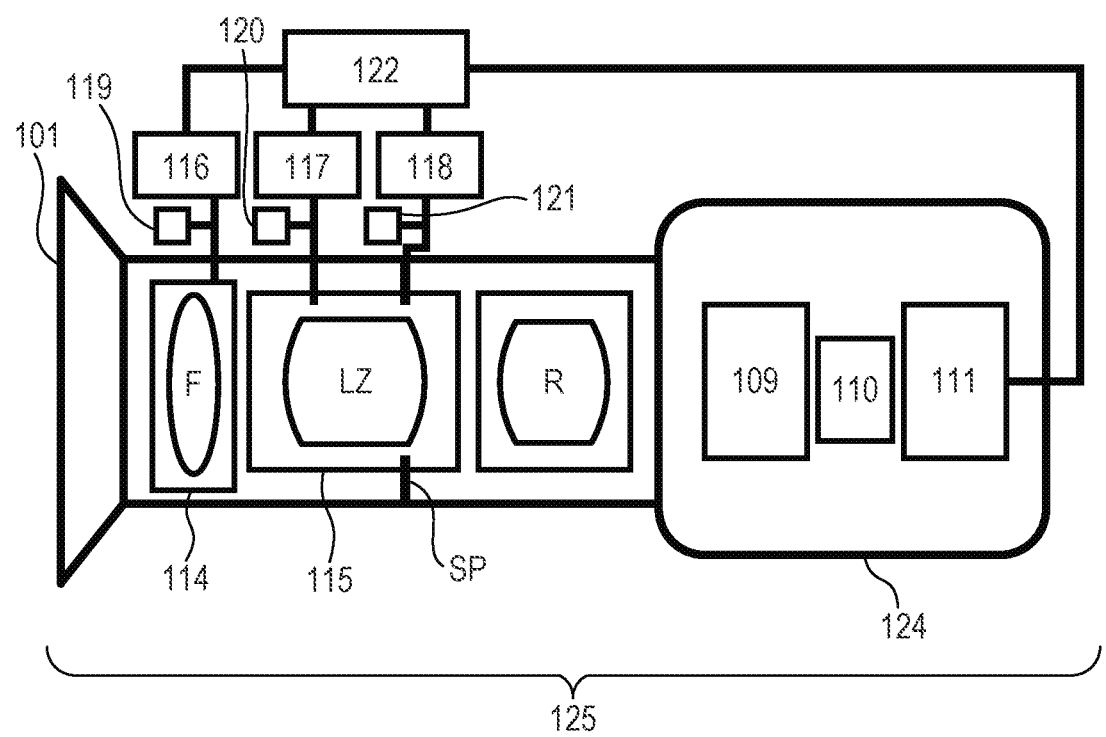
FIG. 20 is a schematic diagram of main parts of an image pickup apparatus of the present invention.

FIG. 20 is a schematic diagram of an image pickup apparatus (television camera system) using the zoom lens of any one of the Embodiments as an image pickup optical system.

In FIG. 20, 101 denotes the zoom lens in one of Embodiments 1 to 9. 124 denotes a camera. The zoom lens 101 is detachably mountable to the camera 124. 125 denotes an image pickup apparatus configured by mounting the zoom lens 101 to the camera 124. The zoom lens 101 has a first lens unit F, a zooming unit LZ, a rear unit R for image formation. The first lens unit F includes lens units for focusing. The zooming unit LZ includes a second lens unit and a third lens unit configured to move on the optical axis for zooming, and a fourth lens unit configured to move on the optical axis for correction of the image plane displacement resulting from the zooming. SP denotes an aperture stop. Reference signs 114 and 115 denote drive mechanisms, such as helicoids and cams, configured to drive the first lens unit F and the zooming unit LZ in the direction of the optical axis, respectively. Reference signs 116 to 118 denote motors (drive means) configured to electrically drive the drive mechanisms 114 and 115 and the aperture stop SP, respectively. Reference signs 119 to 121 denote detectors, such as encoders, potentiometers, or photosensors, configured to detect the positions of the first lens unit F and the zooming unit LZ on the optical axis and the aperture diameter of the aperture stop SP, respectively. As for the camera 124, 109 denotes a glass block corresponding to an optical filter or a color separation optical system in the camera 124, and 110 denotes a solid-state image pickup element (photoelectric conversion element), such as a CCD sensor or a CMOS sensor, configured to receive an image of an object formed by the zoom lens 101. Also, reference signs 111 and 122 denote CPUs configured to control the drive of the various parts of the camera 124 and the zoom lens 101.

By applying the zoom lens of the present invention to a television camera, a camera for filming, or a digital still camera in this manner, an image pickup apparatus having high optical performance is obtained.

Embodiment 2

Figure 3:
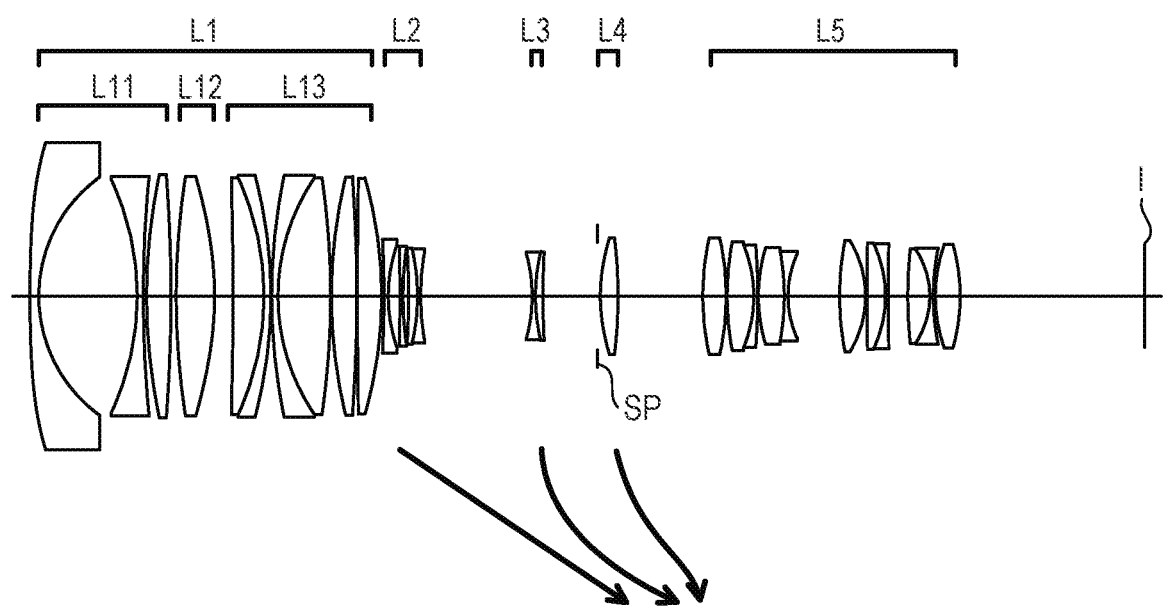
FIG. 3 is a lens cross-sectional view of a zoom lens in Numerical Embodiment 2 in a case of focusing at infinity at the wide angle end.
Figure 4A:
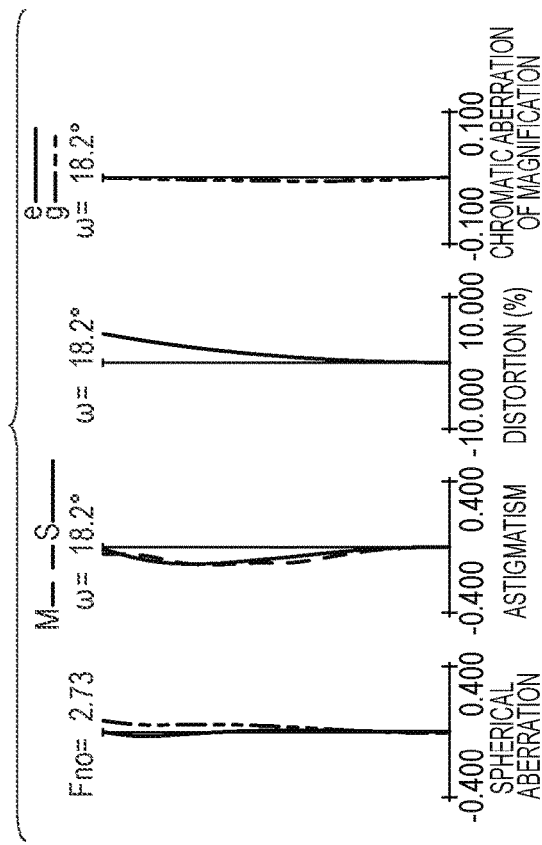
FIG. 4A is a set of aberration diagrams of the zoom lens in Numerical Embodiment 2 in a case of focusing at infinity at the wide angle end.
Figure 4B:
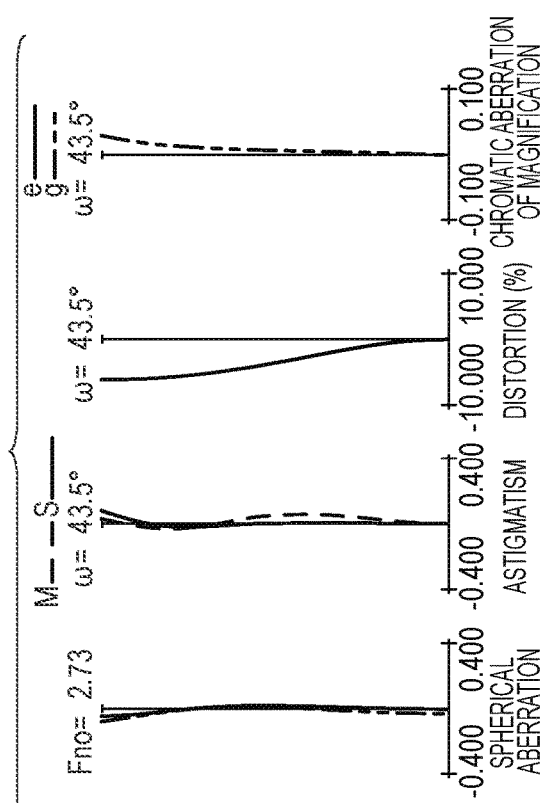
FIG. 4B is a set of aberration diagrams of the zoom lens in Numerical Embodiment 2 in a case of focusing at infinity at f=45 mm.
Figure 4C:
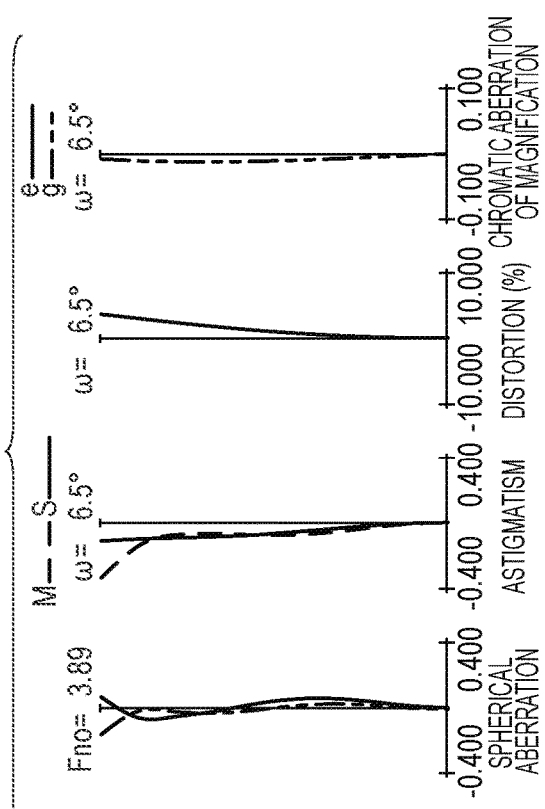
FIG. 4C is a set of aberration diagrams of the zoom lens in Numerical Embodiment 2 in a case of focusing at infinity at the telephoto end.

FIG. 3 is a lens cross-sectional view of a zoom lens as Embodiment 2 (Numerical Embodiment 2) of the present invention in a case of focusing at infinity at the wide angle end. FIGS. 4A, 4B, and 4C are sets of longitudinal aberration diagrams at the wide angle end, a focal length of 45 mm, and the telephoto end in Numerical Embodiment 2, respectively. Each of the aberration diagrams is a longitudinal aberration diagram at infinity focus.

In FIG. 3, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 18th surfaces. The second lens unit L2 corresponds to the 19th to 25th surfaces, the third lens unit L3 corresponds to the 26th to 28th surfaces, and the fourth lens unit L4 corresponds to the 29th to 31st surfaces. The fifth lens unit L5 corresponds to the 32st to 49th surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured to move toward the object side during the focusing. The second sub lens unit and the third sub lens unit move during focusing at such a ratio that the third sub lens unit moves 0.1 mm toward the object side when the second sub lens unit moves 1 mm toward the image side.

The first sub lens unit L11 corresponds to the 1st to 6th surfaces, the second sub lens unit L12 corresponds to the 7th and 8th surfaces, and the third sub lens unit L13 corresponds to the 9th to 18th surfaces. In the Embodiment, a maximum value Lspmax of the interval from the final surface of the first lens unit to the aperture stop corresponds to the interval at the telephoto end.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 3

Figure 5:
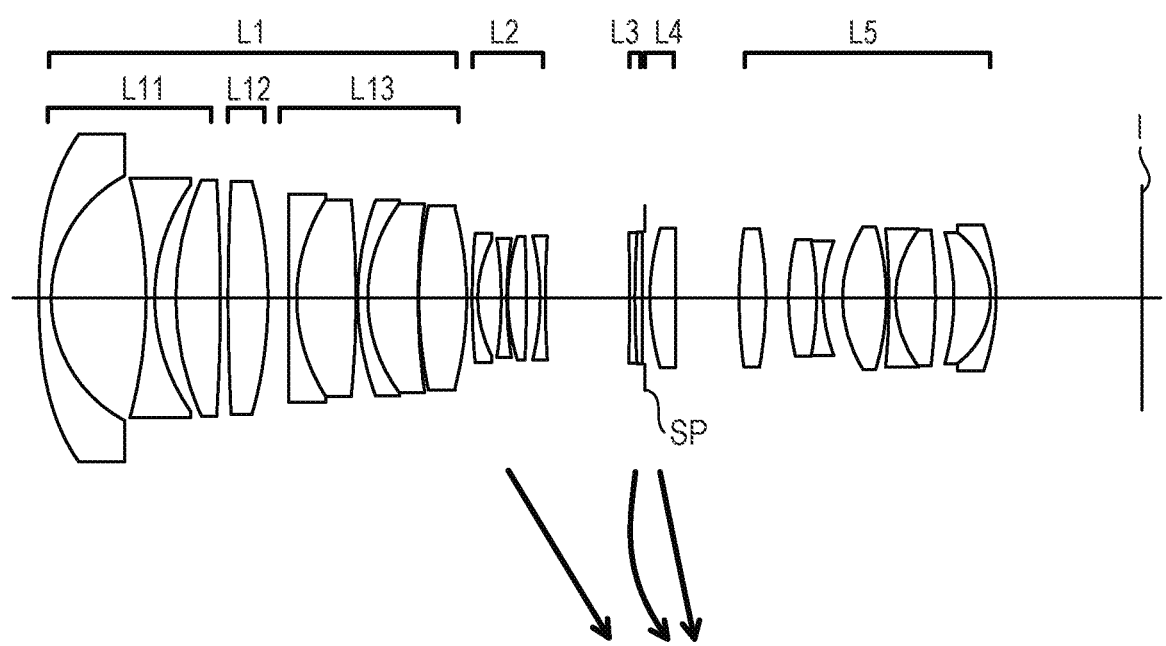
FIG. 5 is a lens cross-sectional view of a zoom lens in Numerical Embodiment 3 in a case of focusing at infinity at the wide angle end.

FIG. 5 is a lens cross-sectional view of a zoom lens as Embodiment 3 (Numerical Embodiment 3) of the present invention in a case of focusing at infinity at the wide angle end. FIGS. 6A, 6B, and 6C are sets of longitudinal aberration diagrams at the wide angle end, a focal length of 27 mm, and the telephoto end in Numerical Embodiment 3, respectively. Each of the aberration diagrams is a longitudinal aberration diagram at infinity focus.

In FIG. 5, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 16th surfaces. The second lens unit L2 corresponds to the 17th to 24th surfaces, the third lens unit L3 corresponds to the 25th to 27th surfaces, and the fourth lens unit L4 corresponds to the 28th to 30th surfaces. The fifth lens unit L5 corresponds to the 31st to 43rd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing.

The first sub lens unit L11 corresponds to the 1st to 6th surfaces, the second sub lens unit L12 corresponds to the 7th and 8th surfaces, and the third sub lens unit L13 corresponds to the 9th to 16th surfaces. In the Embodiment, a maximum value Lspmax of the interval from the final surface of the first lens unit to the aperture stop corresponds to the interval at the telephoto end.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 4

Figure 7:
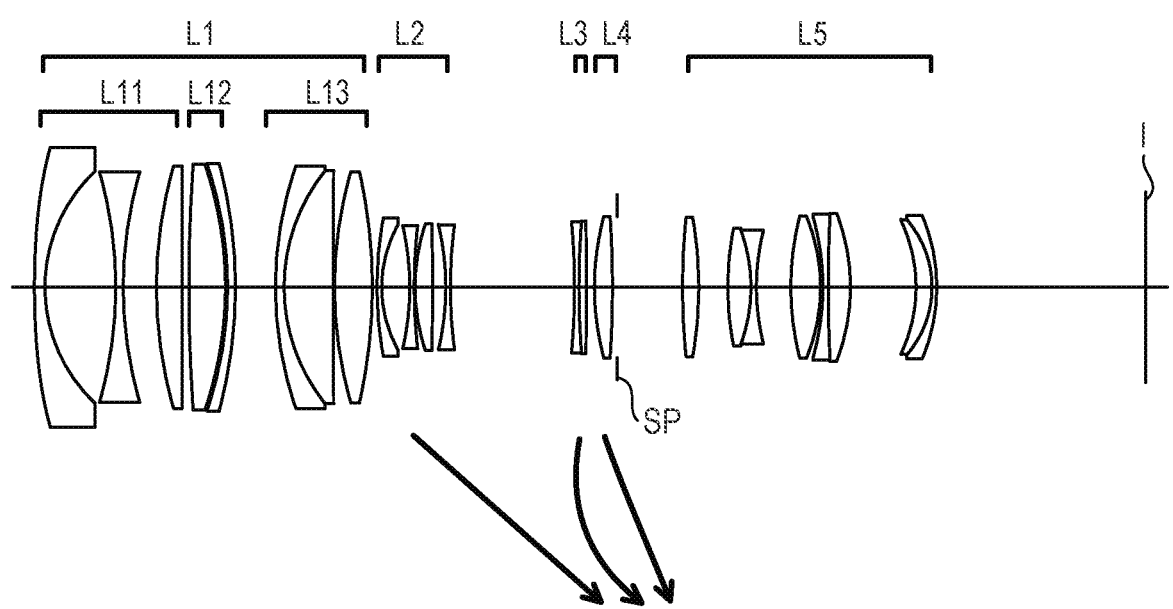
FIG. 7 is a lens cross-sectional view of a zoom lens in Numerical Embodiment 4 in a case of focusing at infinity at the wide angle end.

FIG. 7 is a lens cross-sectional view of a zoom lens as Embodiment 4 (Numerical Embodiment 4) of the present invention in a case of focusing at infinity at the wide angle end. FIGS. 8A, 8B, and 8C are sets of longitudinal aberration diagrams at the wide angle end, a focal length of 45 mm, and the telephoto end in Numerical Embodiment 4, respectively. Each of the aberration diagrams is a longitudinal aberration diagram at infinity focus.

In FIG. 7, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 15th surfaces. The second lens unit L2 corresponds to the 16th to 23rd surfaces, the third lens unit L3 corresponds to the 24th to 26th surfaces, and the fourth lens unit L4 corresponds to the 27th to 29th surfaces. The fifth lens unit L5 corresponds to the 30th to 42nd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing.

The first sub lens unit L11 corresponds to the 1st to 6th surfaces, the second sub lens unit L12 corresponds to the 7th to 10th surfaces, and the third sub lens unit L13 corresponds to the 11th to 15th surfaces. In the Embodiment, a maximum value Lspmax of the interval from the final surface of the first lens unit to the aperture stop corresponds to the interval at the telephoto end.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 5

Figure 9:
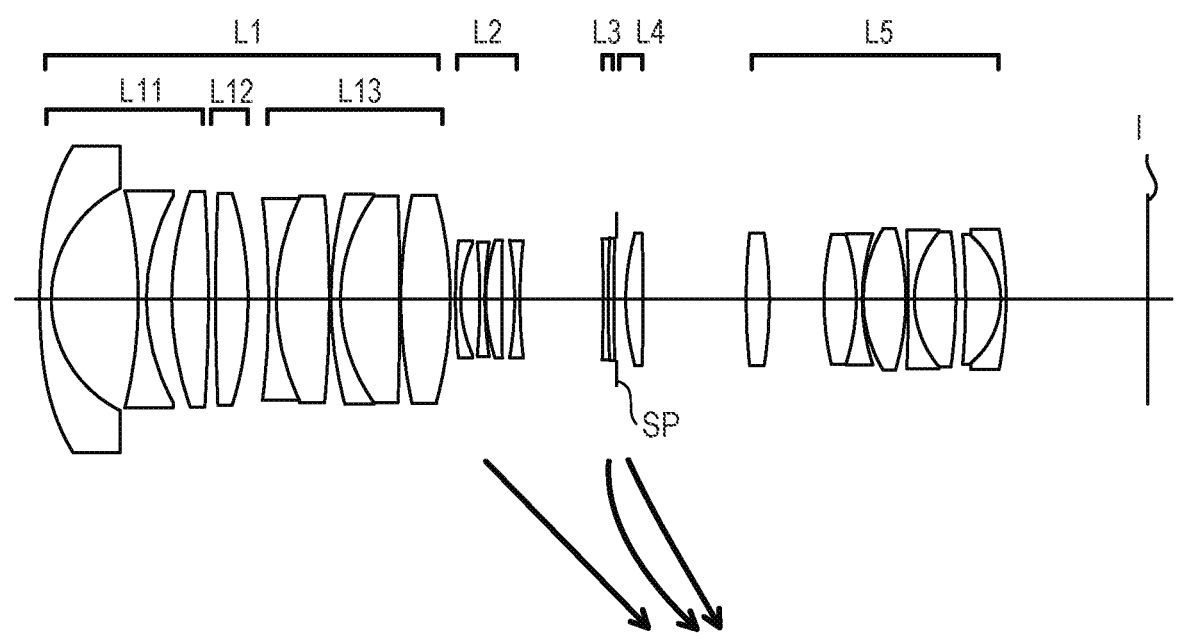
FIG. 9 is a lens cross-sectional view of a zoom lens in Numerical Embodiment 5 in a case of focusing at infinity at the wide angle end.
Figure 10A:
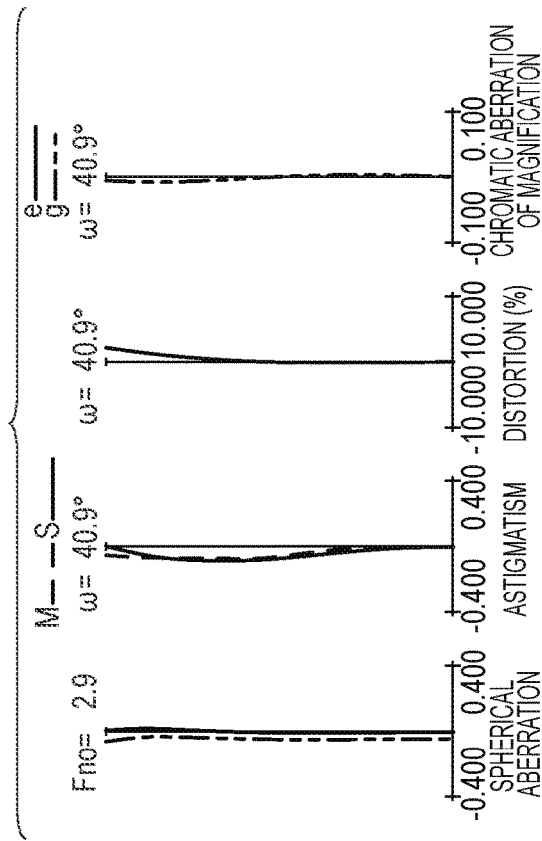
FIG. 10A is a set of aberration diagrams of the zoom lens in Numerical Embodiment 5 in a case of focusing at infinity at the wide angle end.
Figure 10C:
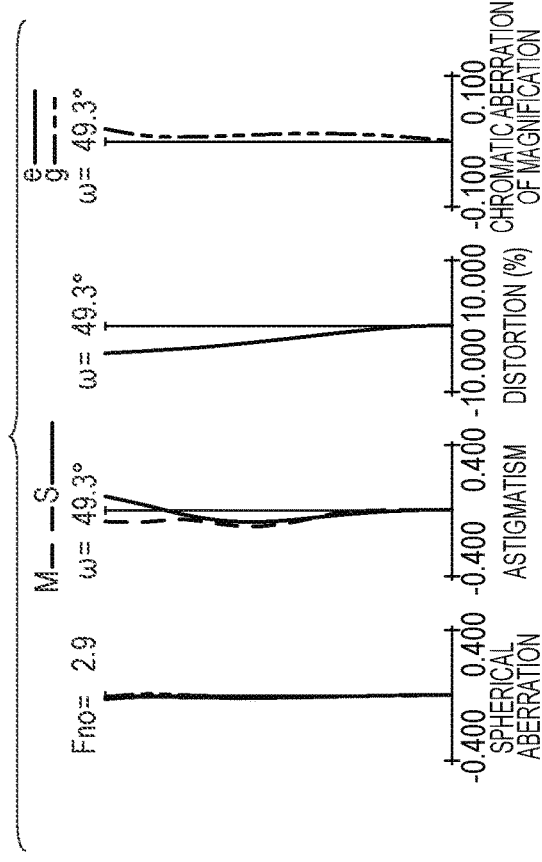
FIG. 10C is a set of aberration diagrams of the zoom lens in Numerical Embodiment 5 in a case of focusing at infinity at the telephoto end.
Figure 10B:
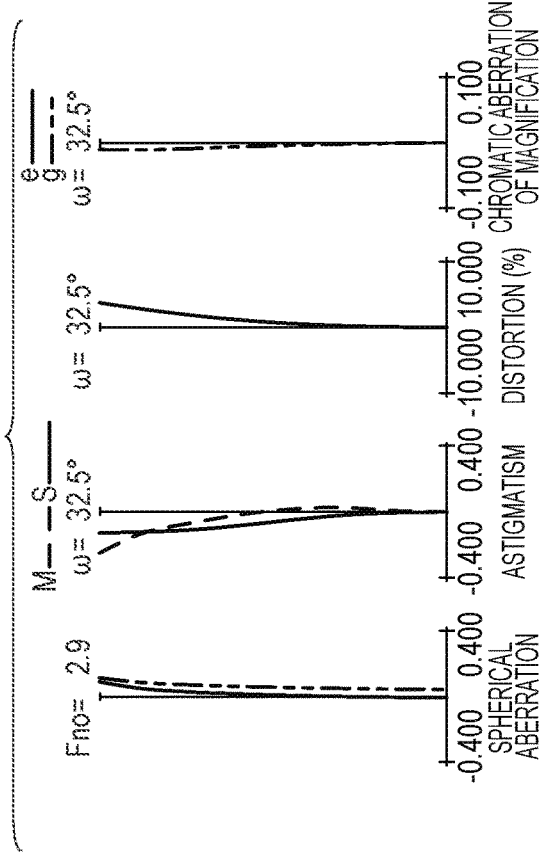
FIG. 10B is a set of aberration diagrams of the zoom lens in Numerical Embodiment 5 in a case of focusing at infinity at f=25 mm.

FIG. 9 is a lens cross-sectional view of a zoom lens as Embodiment 5 (Numerical Embodiment 5) of the present invention in a case of focusing at infinity at the wide angle end. FIGS. 10A, 10B, and 10C are sets of longitudinal aberration diagrams at the wide angle end, a focal length of 25 mm, and the telephoto end in Numerical Embodiment 5, respectively. Each of the aberration diagrams is a longitudinal aberration diagram at infinity focus.

In FIG. 9, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 16th surfaces. The second lens unit L2 corresponds to the 17th to 24th surfaces, the third lens unit L3 corresponds to the 25th to 27th surfaces, and the fourth lens unit L4 corresponds to the 28th to 30th surfaces. The fifth lens unit L5 corresponds to the 31st to 43rd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing.

The first sub lens unit L11 corresponds to the 1st to 6th surfaces, the second sub lens unit L12 corresponds to the 7th and 8th surfaces, and the third sub lens unit L13 corresponds to the 9th to 16th surfaces. In the Embodiment, a maximum value Lspmax of the interval from the final surface of the first lens unit to the aperture stop corresponds to the interval at the telephoto end.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 6

Figure 11:
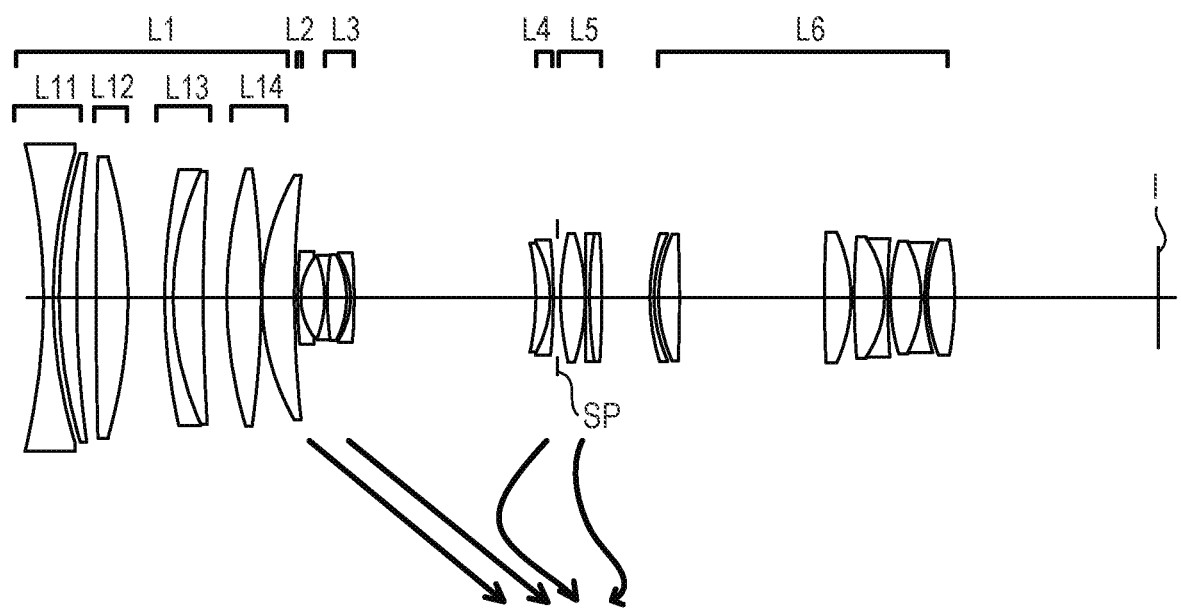
FIG. 11 is a lens cross-sectional view of a zoom lens in Numerical Embodiment 6 in a case of focusing at infinity at the wide angle end.
Figure 12A:
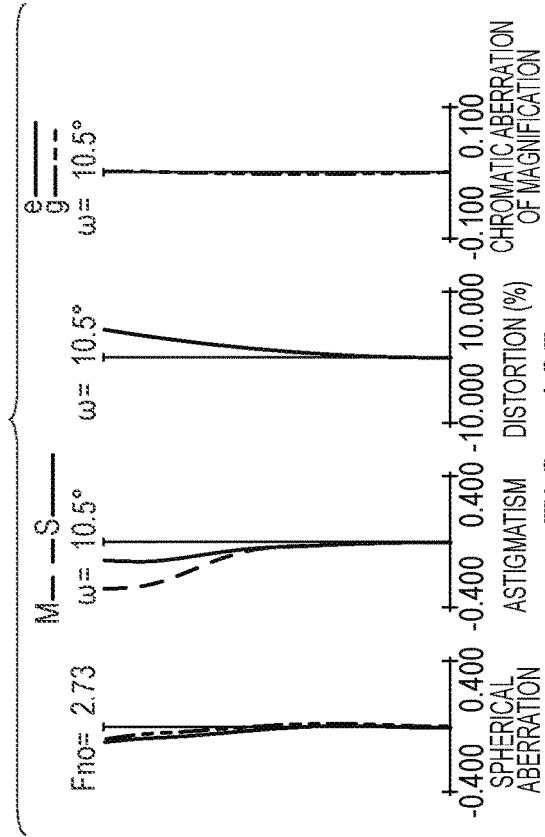
FIG. 12A is a set of aberration diagrams of the zoom lens in Numerical Embodiment 6 in a case of focusing at infinity at the wide angle end.
Figure 12B:
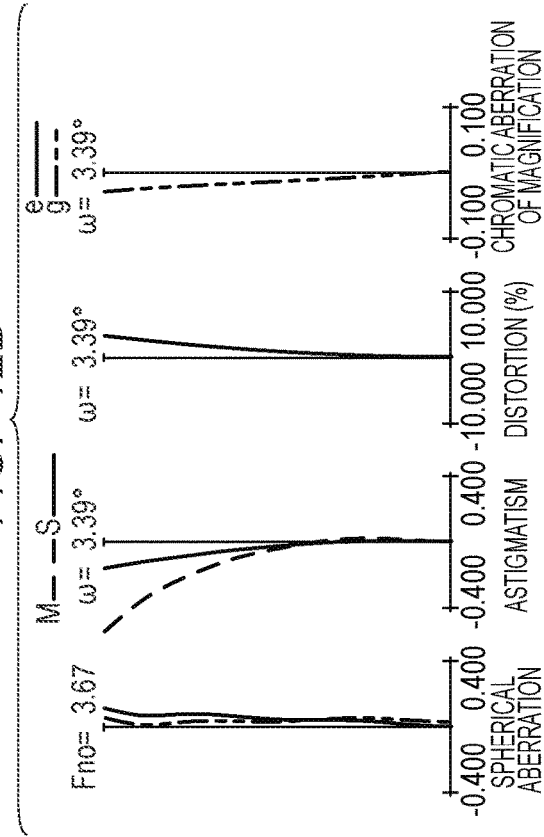
FIG. 12B is a set of aberration diagrams of the zoom lens in Numerical Embodiment 6 in a case of focusing at infinity at f=80 mm.
Figure 12C:
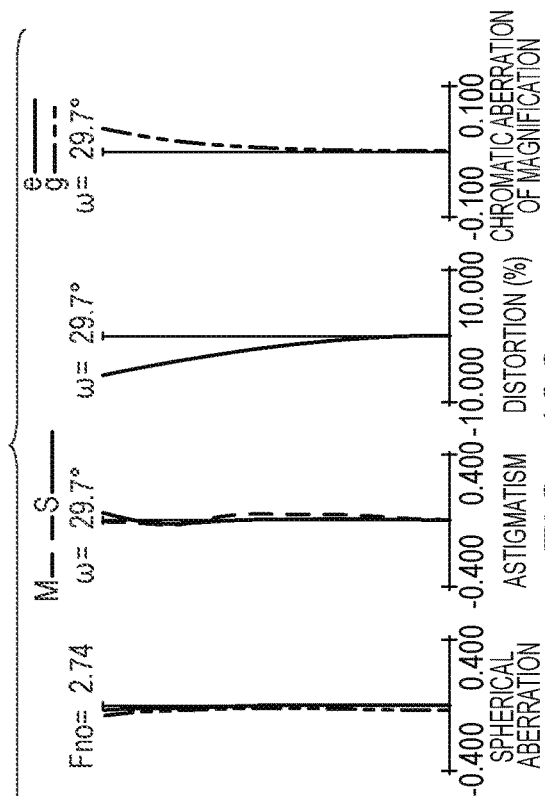
FIG. 12C is a set of aberration diagrams of the zoom lens in Numerical Embodiment 6 in a case of focusing at infinity at f=152.7 mm.
Figure 12D:
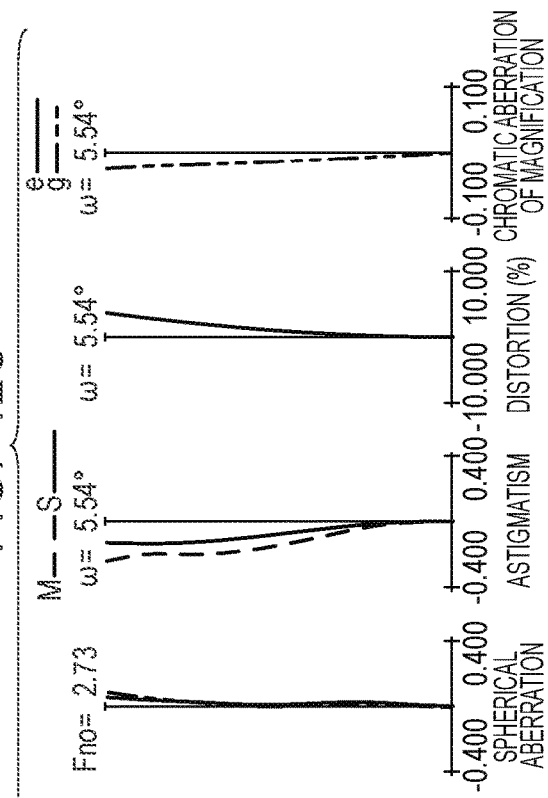
FIG. 12D is a set of aberration diagrams of the zoom lens in Numerical Embodiment 6 in a case of focusing at infinity at the telephoto end.

FIG. 11 is a lens cross-sectional view of a zoom lens as Embodiment 6 (Numerical Embodiment 6) of the present invention in a case of focusing at infinity at the wide angle end. FIGS. 12A, 12B, 12C, and 12D are sets of longitudinal aberration diagrams at the wide angle end, a focal length of 80 mm, a focal length of 152.7 mm, and the telephoto end in Numerical Embodiment 6, respectively. Each of the aberration diagrams is a longitudinal aberration diagram at infinity focus.

In FIG. 11, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, a third lens unit L3 having a negative refractive power and configured to move toward the image side during the zooming, and a fourth lens unit L4 having a negative refractive power and configured to move during zooming. The zoom lens further has a fifth lens unit L5 having a positive refractive power and configured to move non-linearly on the optical axis in conjunction with movement the second length unit L2, the third lens unit L3, and the fourth lens unit L4 to correct the image plane displacement resulting from the zooming. The zoom lens further has a sixth lens unit L6 having a positive refractive power, configured to not to move for zooming, and configured to exhibit an image formation effect. In the Embodiment, the moving lens unit corresponds to the second lens unit L2 and the third lens unit L3, and the subsequent lens units correspond to the fourth lens unit L4 to the sixth lens unit L6. In the Embodiment, the second lens unit L2, the third lens unit L3, the fourth lens unit L4, and the fifth lens unit L5 constitute a zooming system. SP denotes an aperture stop, which is included in the fifth lens unit L5 and disposed on the closest to the object in the fifth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 13th surfaces. The second lens unit L2 corresponds to the 14th and 15th surfaces, the third lens unit L3 corresponds to the 16th to 20th surfaces, and the fourth lens unit L4 corresponds to the 21st to 23rd surfaces. The fifth lens unit L5 corresponds to the 24th to 29th surfaces, and the sixth lens unit L6 corresponds to the 30th to 43rd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, a third sub lens unit L13 configured not to move during focusing, and a fourth sub lens unit L14 having a positive refractive power and configured to move toward the object side during the focusing.

The first sub lens unit L11 corresponds to the 1st to 4th surfaces, the second sub lens unit L12 corresponds to the 5th and 6th surfaces, the third sub lens unit L13 corresponds to the 7th to 9th surfaces, and the fourth sub lens unit L14 corresponds to the 10th to 13th surfaces. The second sub lens unit and the fourth sub lens unit move during focusing at such a ratio that the fourth sub lens unit moves 0.6 mm toward the object side when the second sub lens unit moves 1 mm toward the image side. In the Embodiment, a maximum value Lspmax of the interval from the final surface of the first lens unit to the aperture stop corresponds to the interval at a focal length of 152.7 mm.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 7

Figure 13:
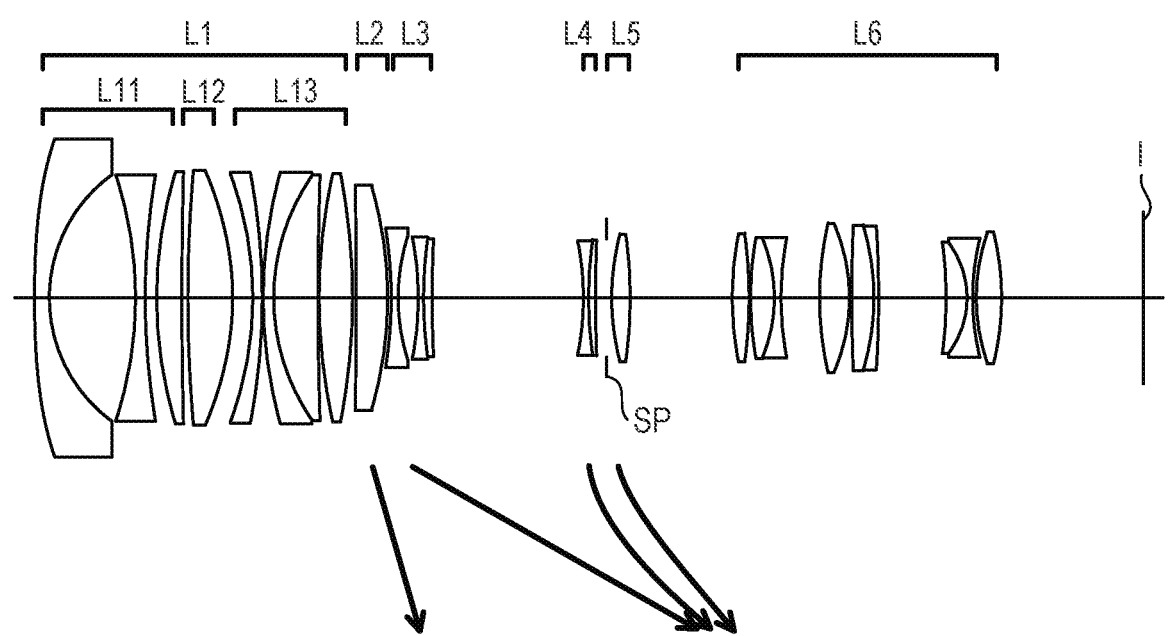
FIG. 13 is a lens cross-sectional view of a zoom lens in Numerical Embodiment 7 in a case of focusing at infinity at the wide angle end.
Figure 14B:
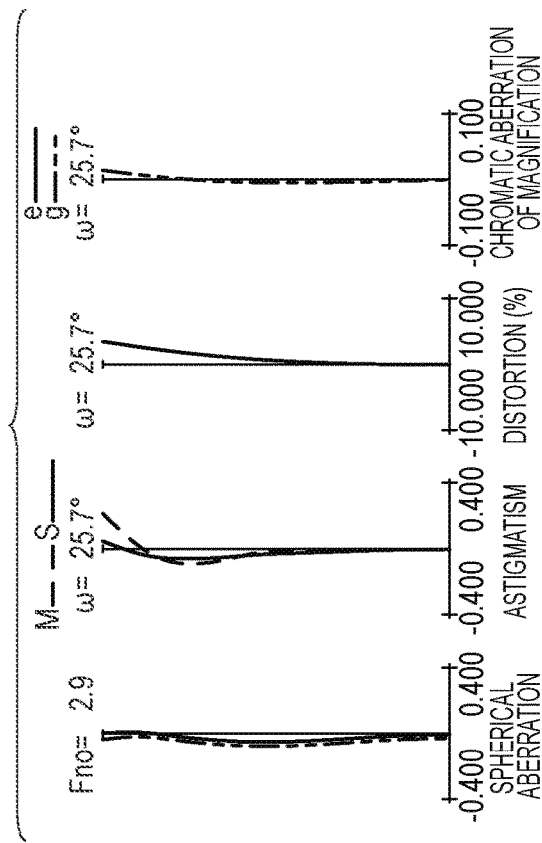
FIG. 14B is a set of aberration diagrams of the zoom lens in Numerical Embodiment 7 in a case of focusing at infinity at f=45 mm.
Figure 14A:
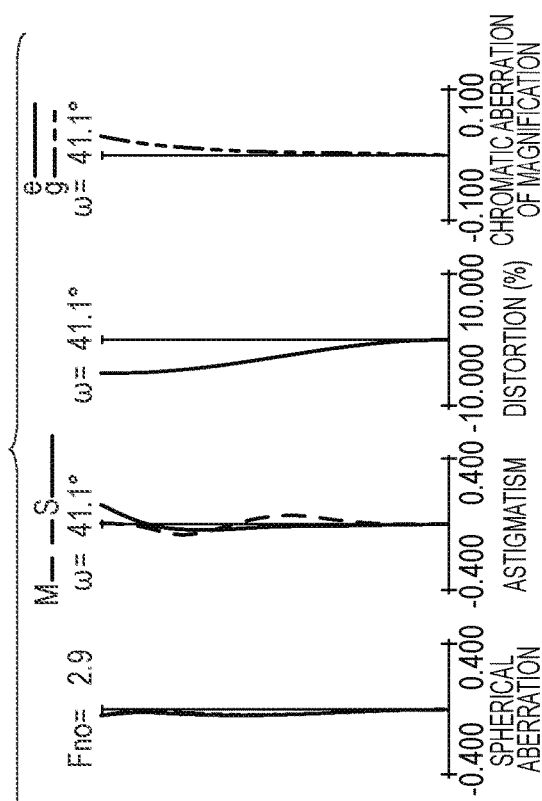
FIG. 14A is a set of aberration diagrams of the zoom lens in Numerical Embodiment 7 in a case of focusing at infinity at the wide angle end.
Figure 14C:
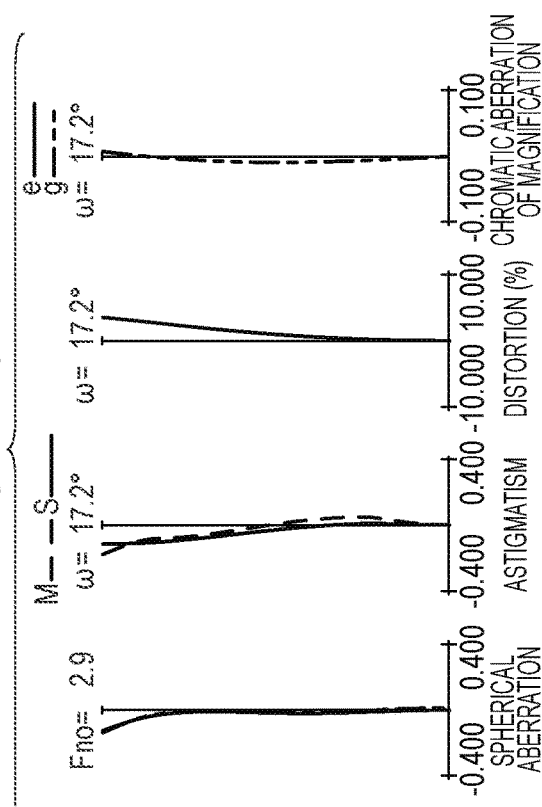
FIG. 14C is a set of aberration diagrams of the zoom lens in Numerical Embodiment 7 in a case of focusing at infinity at the telephoto end.

FIG. 13 is a lens cross-sectional view of a zoom lens as Embodiment 7 (Numerical Embodiment 7) of the present invention in a case of focusing at infinity at the wide angle end. FIGS. 14A, 14B, and 14C are sets of longitudinal aberration diagrams at the wide angle end, a focal length of 45 mm, and the telephoto end in Numerical Embodiment 7, respectively. Each of the aberration diagrams is a longitudinal aberration diagram at infinity focus.

In FIG. 13, in order from the object side to the image side, the zoom lens has a first lens unit L1 for focusing having a positive refractive power. The zoom lens further has a second lens unit L2 having a positive refractive power and configured to move toward the image side during zooming from the wide angle end to the telephoto end, a third lens unit L3 for zooming having a negative refractive power and configured to move toward the image side during the zooming, and a fourth lens unit L4 having a negative refractive power and configured to move during zooming. The zoom lens further has a fifth lens unit L5 having a positive refractive power and configured to move non-linearly on the optical axis in conjunction with movement the second length unit L2, the third lens unit L3, and the fourth lens unit L4 to correct the image plane displacement resulting from the zooming. The zoom lens further has a sixth lens unit L6 having a positive refractive power, configured to not to move for zooming, and configured to exhibit an image formation effect. In the Embodiment, the moving lens unit corresponds to the second lens unit L2 and the third lens unit L3, and the subsequent lens units correspond to the fourth lens unit L4 to the sixth lens unit L6. In the Embodiment, the second lens unit L2, the third lens unit L3, the fourth lens unit L4, and the fifth lens unit L5 constitute a zooming system. SP denotes an aperture stop, which is included in the fifth lens unit L5 and disposed on the closest to the object in the fifth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 15th surfaces. The second lens unit L2 corresponds to the 16th and 17th surfaces, the third lens unit L3 corresponds to the 18th to 22nd surfaces, and the fourth lens unit L4 corresponds to the 23rd to 25th surfaces. The fifth lens unit L5 corresponds to the 26th to 28th surfaces, and the sixth lens unit L6 corresponds to the 29th to 43rd surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing.

The first sub lens unit L11 corresponds to the 1st to 6th surfaces, the second sub lens unit L12 corresponds to the 7th and 8th surfaces, and the third sub lens unit L13 corresponds to the 9th to 15th surfaces. In the Embodiment, a maximum value Lspmax of the interval from the final surface of the first lens unit to the aperture stop corresponds to the interval at the telephoto end.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 8

Figure 15:
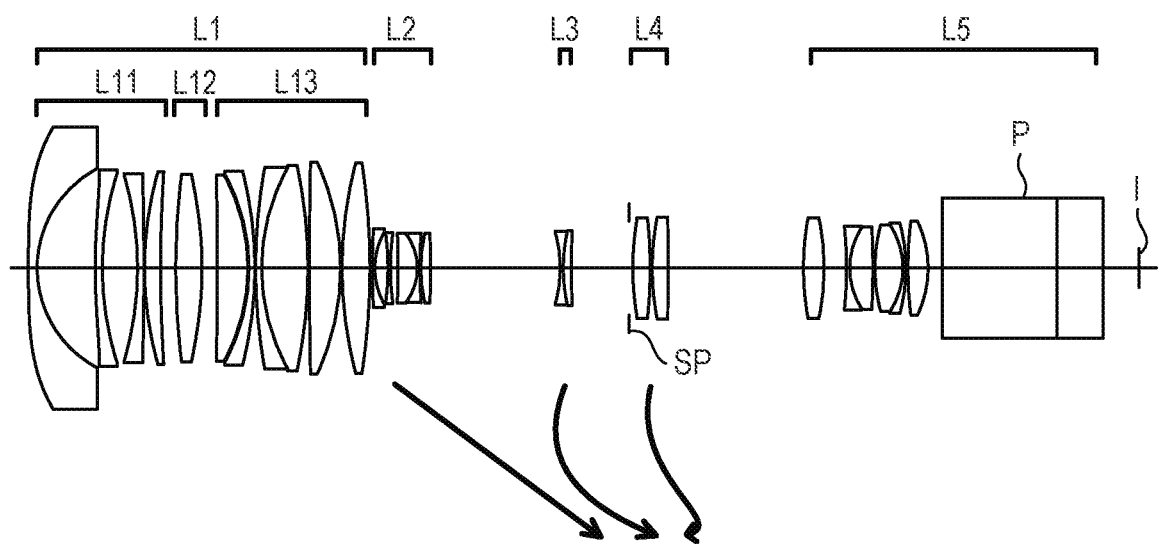
FIG. 15 is a lens cross-sectional view of a zoom lens in Numerical Embodiment 8 in a case of focusing at infinity at the wide angle end.
Figure 16:
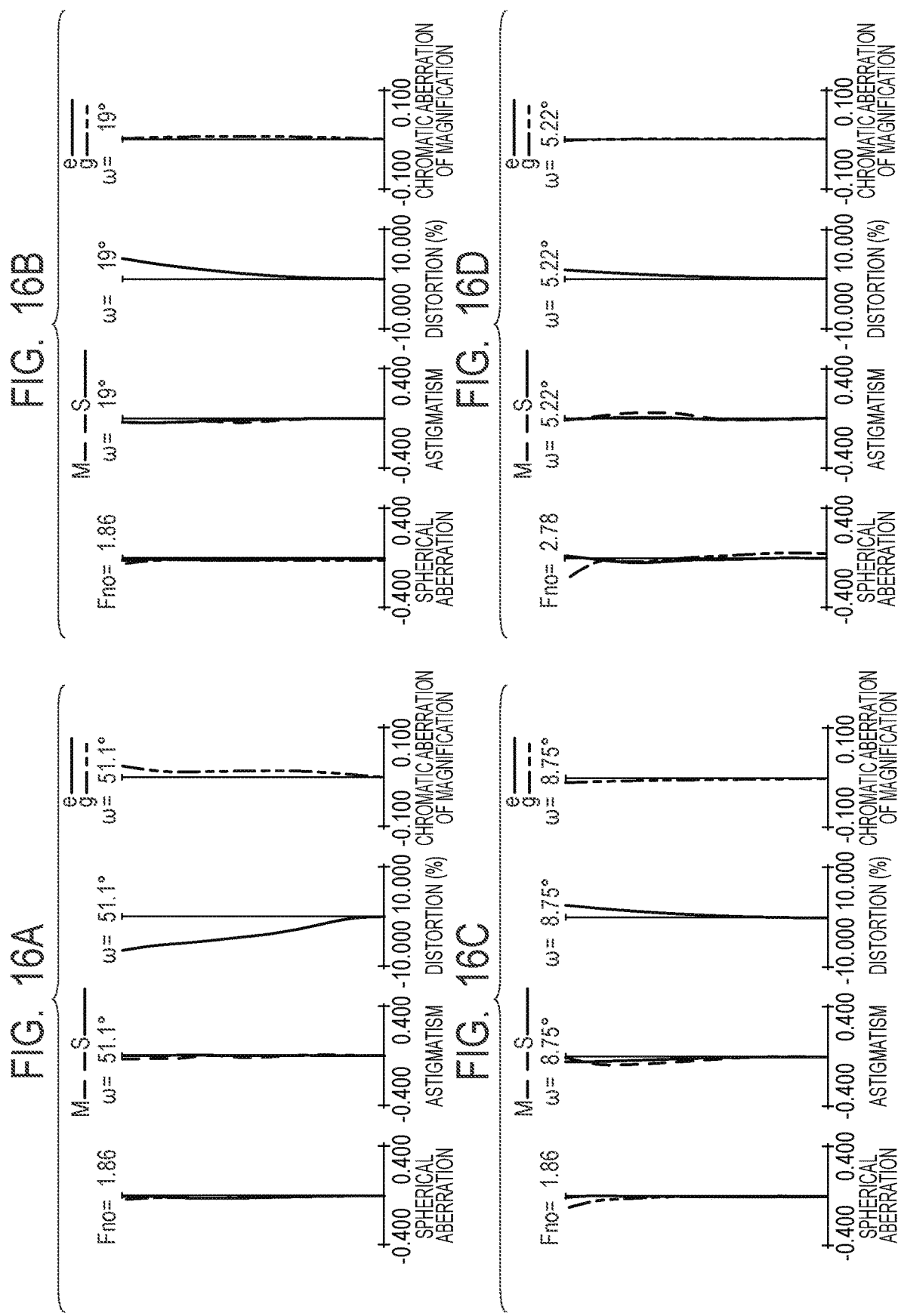
FIG. 16A is a set of aberration diagrams of the zoom lens in Numerical Embodiment 8 in a case of focusing at infinity at the wide angle end.
FIG. 16B is a set of aberration diagrams of the zoom lens in Numerical Embodiment 8 in a case of focusing at infinity at f=16 mm.
FIG. 16C is a set of aberration diagrams of the zoom lens in Numerical Embodiment 8 in a case of focusing at infinity at f=35.7 mm.
FIG. 16D is a set of aberration diagrams of the zoom lens in Numerical Embodiment 8 in a case of focusing at infinity at the telephoto end.

FIG. 15 is a lens cross-sectional view of a zoom lens as Embodiment 8 (Numerical Embodiment 8) of the present invention in a case of focusing at infinity at the wide angle end. FIGS. 16A, 16B, 16C, and 16D are sets of longitudinal aberration diagrams at the wide angle end, a focal length of 16 mm, a focal length of 35.7 mm, and the telephoto end in Numerical Embodiment 8, respectively. Each of the aberration diagrams is a longitudinal aberration diagram at infinity focus.

In FIG. 15, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. P denotes a glass block representing a color separation prism or an optical filter. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 21st surfaces. The second lens unit L2 corresponds to the 22nd to 30th surfaces, the third lens unit L3 corresponds to the 31st to 33rd surfaces, and the fourth lens unit L4 corresponds to the 34th to 38th surfaces. The fifth lens unit L5 corresponds to the 39th to 48th surfaces. The first lens unit L1 includes a first sub lens unit L11 having a negative refractive power and configured not to move during focusing, a second sub lens unit L12 having a positive refractive power and configured to move toward the image side during focusing from infinity to the closest distance, and a third sub lens unit L13 having a positive refractive power and configured not to move during focusing.

The first sub lens unit L11 corresponds to the 1st to 8th surfaces, the second sub lens unit L12 corresponds to the 9th and 10th surfaces, and the third sub lens unit L13 corresponds to the 11th to 21st surfaces. In the Embodiment, a maximum value Lspmax of the interval from the final surface of the first lens unit to the aperture stop corresponds to the interval at a focal length of 35.7 mm.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Embodiment 9

Figure 17:
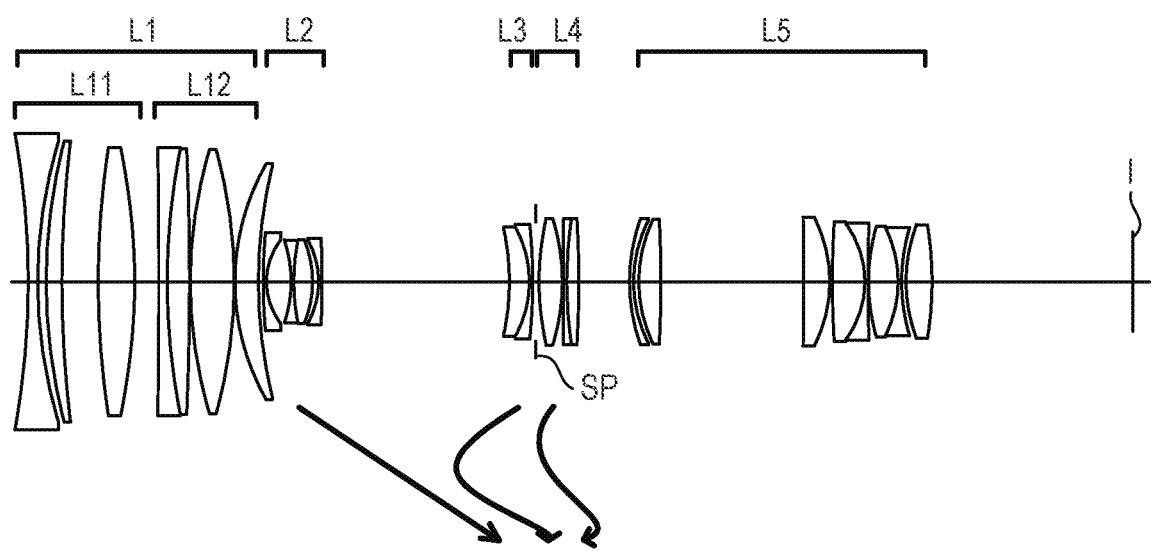
FIG. 17 is a lens cross-sectional view of a zoom lens in Numerical Embodiment 9 in a case of focusing at infinity at the wide angle end.
Figure 18A:
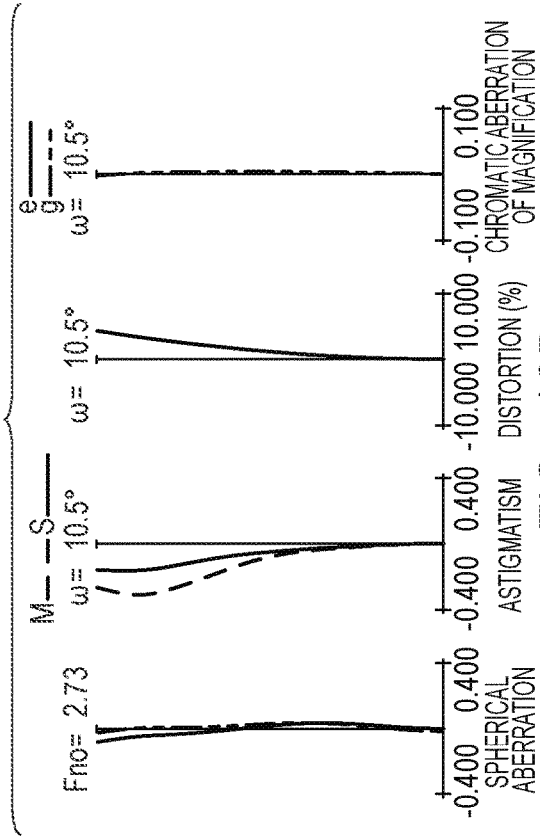
FIG. 18A is a set of aberration diagrams of the zoom lens in Numerical Embodiment 9 in a case of focusing at infinity at the wide angle end.
Figure 18B:
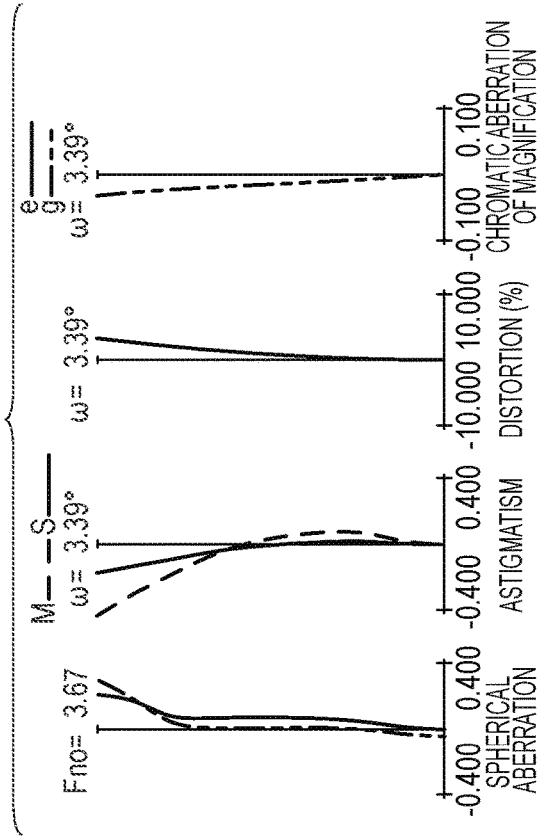
FIG. 18B is a set of aberration diagrams of the zoom lens in Numerical Embodiment 9 in a case of focusing at infinity at f=80 mm.
Figure 18C:
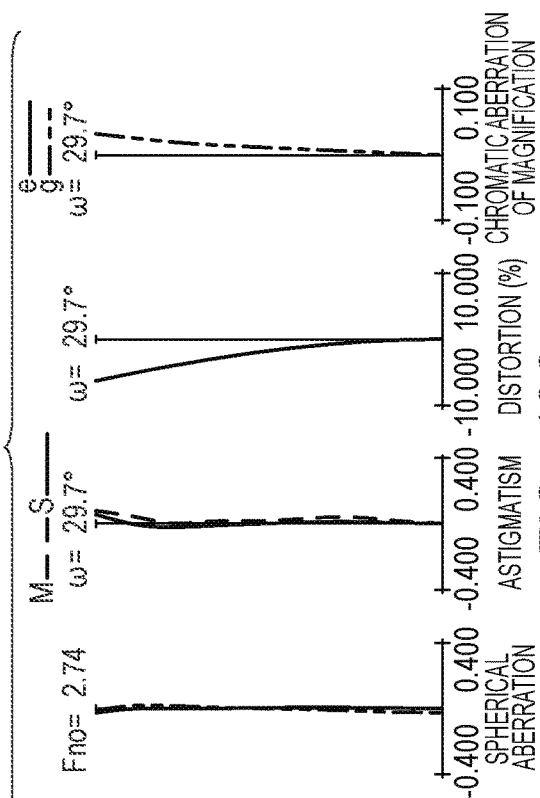
FIG. 18C is a set of aberration diagrams of the zoom lens in Numerical Embodiment 9 in a case of focusing at infinity at f=165.4 mm.
Figure 18D:
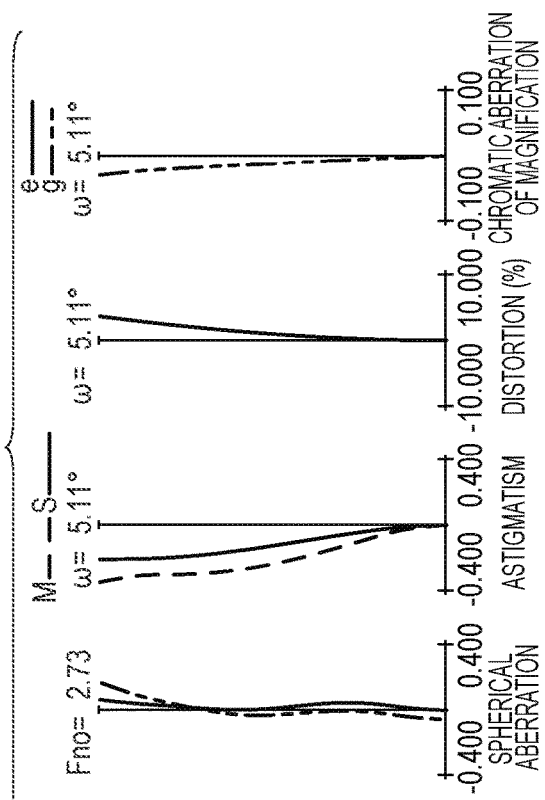
FIG. 18D is a set of aberration diagrams of the zoom lens in Numerical Embodiment 9 in a case of focusing at infinity at the telephoto end.

FIG. 17 is a lens cross-sectional view of a zoom lens as Embodiment 9 (Numerical Embodiment 9) of the present invention in a case of focusing at infinity at the wide angle end. FIGS. 18A, 18B, 18C, and 18D are sets of longitudinal aberration diagrams at the wide angle end, a focal length of 80 mm, a focal length of 165.4 mm, and the telephoto end in Numerical Embodiment 9, respectively. Each of the aberration diagrams is a longitudinal aberration diagram at infinity focus.

In FIG. 17, in order from the object side to the image side, the zoom lens has a first lens unit L1 for focusing having a positive refractive power. The zoom lens further has a second lens unit L2 for zooming having a negative refractive power and configured to move toward the image side during zooming from the wide angle end to the telephoto end, and a third lens unit L3 having a negative refractive power and configured to move during zooming. The zoom lens further has a fourth lens unit L4 having a positive refractive power and configured to move non-linearly on the optical axis in conjunction with movement the second length unit L2 and the third lens unit L3 to correct the image plane displacement resulting from the zooming. The zoom lens further has a fifth lens unit L5 having a positive refractive power, configured to not to move for zooming, and configured to exhibit an image formation effect. In the Embodiment, the moving lens unit corresponds to the second lens unit L2, and the subsequent lens units correspond to the third lens unit L3 to the fifth lens unit L5. In the Embodiment, the second lens unit L2, the third lens unit L3, and the fourth lens unit L4 constitute a zooming system. SP denotes an aperture stop, which is included in the fourth lens unit L4 and disposed on the closest to the object in the fourth lens unit. I denotes the image plane, which corresponds to the image pickup surface of, for example, a solid-state image pickup element that receives an image formed by the zoom lens and photoelectrically converts the image (photoelectric conversion element) when the zoom lens is used as an image pickup optical system for a television camera for broadcasting, a video camera, or a digital still camera. The image plane corresponds to a film surface to be exposed to an image formed by the zoom lens when the zoom lens is used as an image pickup optical system for a film camera.

The first lens unit L1 corresponds to the 1st to 13th surfaces. The second lens unit L2 corresponds to the 14th to 20th surfaces, the third lens unit L3 corresponds to the 21st to 23rd surfaces, and the fourth lens unit L4 corresponds to the 24th to 29th surfaces. The fifth lens unit L5 corresponds to the 30th to 43rd surfaces. The first lens unit L1 includes a first sub lens unit L11 configured not to move during focusing, and a second sub lens unit L12 having a positive refractive power and configured to move toward the object side during focusing from infinity to the closest distance. The first sub lens unit L11 corresponds to the 1st to 6th surfaces, and the second sub lens unit L12 corresponds to the 7th to 13th surfaces. In the Embodiment, a maximum value Lspmax of the interval from the final surface of the first lens unit to the aperture stop corresponds to the interval at a focal length of 165.4 mm.

The values corresponding to the conditional expressions in the Embodiment are listed in table 1. This Embodiment satisfies the conditional expressions (1) to (7). By appropriately setting the position of the aperture stop and the length of the first lens unit, the Embodiment provides a zoom lens having a wide angle of view and a small size and weight and having high optical performance across the entire zoom range.

Although preferred embodiments have been described above, the present invention is not limited to these embodiments. Various modifications and changes can be made without departing from the gist of the invention. A characteristic feature of the present invention is to appropriately set the position of the aperture stop and the length of the first lens unit. The advantageous effect of the present invention can be achieved even when the moving lens units and the subsequent lens units have configurations other than those in numeral Embodiments 1 to 9.

[Numerical Value Embodiment 1]
[Unit mm]

Surface data

| Surface number | r | d | nd | vd | Effective diameter |
|---|---|---|---|---|---|
| 1* | 10000.000 | 2.58 | 1.77250 | 49.6 | 84.03 |
| 2 | 35.148 | 16.32 | | | 61.12 |
| 3 | 158.903 | 1.65 | 1.69680 | 55.5 | 60.33 |
| 4 | 51.485 | 18.21 | | | 56.77 |
| 5 | −50.951 | 1.65 | 1.64000 | 60.1 | 56.83 |
| 6 | −88.454 | 0.20 | | | 59.56 |
| 7 | 321.453 | 6.56 | 1.89286 | 20.4 | 62.44 |
| 8 | −163.850 | 1.50 | | | 62.68 |
| 9 | 101.588 | 9.41 | 1.53775 | 74.7 | 64.43 |
| 10* | −187.587 | 7.07 | | | 64.21 |
| 11 | 811.450 | 16.39 | 1.49700 | 81.5 | 63.46 |
| 12 | −45.808 | 2.00 | 1.83400 | 37.2 | 63.20 |
| 13 | −58.177 | 0.20 | | | 64.56 |
| 14 | 137.741 | 1.84 | 1.85478 | 24.8 | 58.15 |
| 15 | 45.386 | 11.27 | 1.49700 | 81.5 | 54.65 |
| 16 | −2711.283 | 0.88 | | | 54.23 |
| 17 | 381.985 | 5.72 | 1.76385 | 48.5 | 53.59 |
| 18 | −130.116 | (variable) | | | 53.09 |
| 19* | −186.475 | 1.20 | 1.76385 | 48.5 | 30.78 |
| 20 | 45.723 | 3.98 | | | 28.10 |
| 21 | −129.701 | 0.83 | 1.53775 | 74.7 | 27.38 |
| 22 | 125.803 | 3.48 | 1.85478 | 24.8 | 26.57 |
| 23 | −69.230 | 0.83 | 1.76385 | 48.5 | 26.07 |
| 24 | 127.983 | (variable) | | | 25.07 |
| 25 | −58.052 | 0.83 | 1.88300 | 40.8 | 23.19 |
| 26 | 53.242 | 2.08 | 1.92286 | 18.9 | 23.99 |
| 27 | 234.394 | (variable) | | | 24.21 |
| 28(stop) | ∞ | 1.00 | | | 26.50 |
| 29* | 38.066 | 4.04 | 1.69680 | 55.5 | 28.40 |
| 30 | −8460.106 | (variable) | | | 28.41 |
| 31 | 79.557 | 1.11 | 2.00069 | 25.5 | 28.49 |
| 32 | 33.790 | 5.95 | 1.51633 | 64.1 | 27.99 |
| 33 | −70.610 | 35.00 | | | 28.08 |
| 34 | 56.081 | 6.76 | 1.51633 | 64.1 | 32.04 |
| 35 | −45.123 | 0.37 | | | 32.00 |
| 36 | 1063.083 | 4.82 | 1.95906 | 17.5 | 30.43 |
| 37 | −37.583 | 0.83 | 1.91650 | 31.6 | 30.04 |
| 38 | 851.505 | 0.50 | | | 28.92 |
| 39 | 78.955 | 6.81 | 1.43875 | 94.7 | 28.09 |
| 40 | −26.310 | 0.92 | 2.00330 | 28.3 | 27.29 |
| 41 | 47.275 | 0.65 | | | 27.59 |
| 42 | 35.926 | 5.52 | 1.58913 | 61.1 | 28.90 |
| 43 | −110.811 | 39.00 | | | 29.06 |
| Image plane | ∞ | | | | |

-continued

[Numerical Value Embodiment 1]
[Unit mm]

Aspheric surface data

1st surface

K = 0.00000e+000
A4 = 2.75294e−006
A6 = −1.21616e−009
A8 = 6.86055e−013
A10 = −4.48850e−016
A12 = 2.65740e−019
A14 = −9.69561e−023
A16 = 1.48551e−026

10th surface

K = 0.00000e+000
A4 = 1.60603e−006
A6 = −1.75171e−010
A8 = 1.76979e−013
A10 = −1.53798e−016
A12 = 5.27295e−020

19th surface

K = 0.00000e+000
A4 = 2.11133e−006
A6 = −4.61442e−009
A8 = 1.68496e−011
A10 = −4.54176e−014
A12 = 3.79218e−017

29th surface

K = 0.00000e+000
A4 = −5.63317e−006
A6 = 1.06652e−009
A8 = −1.13406e−012

Various data
Zoom ratio 4.81

| | Wide angle | Middle | Telephoto |
|---|---|---|---|
| Focal length | 13.50 | 30.00 | 65.00 |
| F-number | 2.70 | 2.70 | 3.07 |
| Half angle of view | 47.63 | 26.26 | 12.83 |
| Image height | 14.80 | 14.80 | 14.80 |
| Total lens length | 288.77 | 288.77 | 288.77 |
| BF | 39.00 | 39.00 | 39.00 |
| d18 | 0.70 | 31.90 | 50.48 |
| d24 | 24.62 | 4.81 | 5.57 |
| d27 | 15.48 | 13.66 | 1.30 |
| d30 | 18.05 | 8.47 | 1.50 |
| Entrance pupil position | 33.67 | 45.97 | 63.00 |
| Exit pupil position | −143.43 | −97.40 | −76.50 |
| Front principal point position | 46.18 | 69.37 | 91.42 |
| Rear principal point position | 25.50 | 8.99 | −26.00 |

Zoom lens unit data

| Unit | Start surface | Focal length | Lens structure length | Front principal point position | Rear principal point position |
|---|---|---|---|---|---|
| 1 | 1 | 38.44 | 103.45 | 50.80 | 53.03 |
| 2 | 19 | −35.74 | 10.31 | 1.91 | −5.43 |
| 3 | 25 | −54.05 | 2.91 | 0.31 | −1.20 |
| 4 | 28 | 54.16 | 5.04 | 1.01 | −2.36 |
| 5 | 31 | 69.73 | 69.23 | 20.91 | −35.54 |

[Numerical Value Embodiment 2]
[Unit mm]

Surface data

| Surface number | r | d | nd | vd | Effective diameter |
|---|---|---|---|---|---|
| 1* | 462.092 | 2.58 | 1.80100 | 35.0 | 88.73 |
| 2 | 42.361 | 28.69 | | | 68.91 |
| 3 | −78.433 | 1.65 | 1.64000 | 60.1 | 67.61 |
| 4 | 333.611 | 1.03 | | | 69.24 |
| 5 | 167.127 | 7.10 | 1.95906 | 17.5 | 70.38 |
| 6 | −456.682 | 1.50 | | | 70.33 |
| 7 | 220.656 | 11.18 | 1.53775 | 74.7 | 69.21 |
| 8* | −98.247 | 5.37 | | | 68.66 |
| 9 | −1260.553 | 9.06 | 1.48749 | 70.2 | 68.49 |
| 10 | −81.355 | 2.00 | 1.85025 | 30.1 | 68.51 |
| 11 | −134.002 | 0.20 | | | 69.71 |
| 12 | 169.188 | 1.84 | 1.84666 | 23.8 | 69.73 |
| 13 | 60.553 | 15.34 | 1.43875 | 94.7 | 68.06 |
| 14 | −231.208 | 0.18 | | | 68.39 |
| 15 | 144.052 | 7.41 | 1.53775 | 74.7 | 68.89 |
| 16 | −472.329 | 0.18 | | | 68.64 |
| 17 | 2168.350 | 7.08 | 1.76385 | 48.5 | 68.18 |
| 18 | −122.037 | (variable) | | | 67.84 |
| 19* | −230.314 | 1.20 | 1.59522 | 67.7 | 32.88 |
| 20 | 44.448 | 3.43 | | | 29.38 |
| 21 | −441.532 | 0.83 | 1.59522 | 67.7 | 28.73 |
| 22 | 90.940 | 1.66 | | | 27.64 |
| 23 | −229.868 | 2.67 | 1.85478 | 24.8 | 27.51 |
| 24 | −56.164 | 0.83 | 1.59522 | 67.7 | 27.13 |
| 25 | 70.262 | (variable) | | | 25.61 |
| 26 | −42.350 | 0.83 | 1.80400 | 46.5 | 23.89 |
| 27 | 51.250 | 2.25 | 1.89286 | 20.4 | 25.25 |
| 28 | 225.727 | (variable) | | | 25.55 |
| 29(stop) | ∞ | 0.92 | | | 31.00 |
| 30* | 49.882 | 5.22 | 1.69680 | 55.5 | 33.41 |
| 31 | −127.991 | (variable) | | | 33.59 |
| 32 | 73.182 | 6.94 | 1.58913 | 61.1 | 33.73 |
| 33 | −73.456 | 0.18 | | | 33.24 |
| 34 | 81.472 | 7.85 | 1.48749 | 70.2 | 31.21 |
| 35 | −38.239 | 1.11 | 2.00069 | 25.5 | 29.50 |
| 36 | −197.354 | 0.18 | | | 29.04 |
| 37 | 47.174 | 7.59 | 1.51823 | 58.9 | 27.86 |
| 38 | −66.743 | 1.01 | 1.79952 | 42.2 | 25.79 |
| 39 | 28.931 | 14.97 | | | 24.14 |
| 40 | 78.871 | 7.66 | 1.48749 | 70.2 | 31.62 |
| 41 | −30.422 | 0.37 | | | 31.96 |
| 42 | 685.122 | 5.40 | 1.92286 | 18.9 | 30.55 |
| 43 | −35.070 | 0.83 | 1.88300 | 40.8 | 30.26 |
| 44 | 1100.789 | 5.63 | | | 29.42 |
| 45 | 121.840 | 6.46 | 1.43875 | 94.7 | 27.25 |
| 46 | −24.188 | 0.92 | 2.00100 | 29.1 | 26.74 |
| 47 | 65.081 | 0.65 | | | 27.81 |
| 48 | 43.455 | 7.25 | 1.58913 | 61.1 | 29.30 |
| 49 | −53.992 | 39.69 | | | 29.84 |
| Image plane | ∞ | | | | |

Aspheric surface data

1st surface

K = 0.00000e+000
A4 = 5.24769e−007
A6 = 2.35380e−010
A8 = −1.85666e−013
A10 = 6.17119e−017
A12 = −8.21780e−021

8th surface

K = 0.00000e+000
A4 = 6.10331e−007
A6 = −1.49850e−011
A8 = 4.84677e−014
A10 = −6.88074e−017
A12 = 2.18402e−020

19th surface

K = 0.00000e+000
A4 = 2.13155e−006
A6 = −4.06850e−009
A8 = 9.20467e−012
A10 = −1.88863e−014
A12 = 1.82968e−017

30th surface

K = 0.00000e+000
A4 = −3.98145e−006
A6 = 1.84633e−009
A8 = −1.62747e−012

Various data
Zoom ratio 8.34

| | Wide angle | Middle | Telephoto |
|---|---|---|---|
| Focal length | 15.58 | 45.00 | 130.00 |
| F-number | 2.73 | 2.73 | 3.89 |
| Half angle of view | 43.53 | 18.21 | 6.50 |
| Image height | 14.80 | 14.80 | 14.80 |
| Total lens length | 310.44 | 310.44 | 310.44 |
| BF | 39.69 | 39.69 | 39.69 |
| d18 | 0.69 | 41.92 | 63.54 |
| d25 | 32.55 | 5.31 | 7.20 |
| d28 | 15.77 | 16.00 | 1.30 |
| d31 | 24.53 | 10.30 | 1.50 |
| Entrance pupil position | 43.90 | 75.87 | 134.47 |
| Exit pupil position | −144.27 | −95.83 | −77.30 |
| Front principal point position | 58.16 | 105.93 | 120.01 |
| Rear principal point position | 24.11 | −5.31 | −90.31 |

Zoom lens unit data

| Unit | Start surface | Focal length | Lens structure length | Front principal point position | Rear principal point position |
|---|---|---|---|---|---|
| 1 | 1 | 52.08 | 102.38 | 59.99 | 46.05 |
| 2 | 19 | −30.23 | 10.63 | 3.21 | −4.84 |
| 3 | 26 | −46.89 | 3.08 | 0.27 | −1.36 |
| 4 | 29 | 51.92 | 6.14 | 1.79 | −2.24 |
| 5 | 32 | 80.89 | 75.00 | 14.97 | −49.74 |

[Numerical Value Embodiment 3]
[Unit mm]

Surface data

| Surface number | r | d | nd | vd | Effective diameter |
|---|---|---|---|---|---|
| 1* | 114.337 | 2.40 | 1.76385 | 48.5 | 63.16 |
| 2 | 26.688 | 18.47 | | | 47.14 |
| 3 | −85.846 | 1.65 | 1.76385 | 48.5 | 46.06 |
| 4 | 37.734 | 4.09 | | | 43.54 |
| 5 | 54.557 | 8.67 | 1.85478 | 24.8 | 45.45 |
| 6 | −365.990 | 1.50 | | | 45.37 |
| 7 | 418.901 | 7.75 | 1.53775 | 74.7 | 44.91 |
| 8* | −81.706 | 4.06 | | | 44.32 |
| 9 | −2459.081 | 1.50 | 1.80000 | 29.8 | 40.10 |
| 10 | 34.772 | 11.56 | 1.49700 | 81.5 | 37.84 |
| 11 | −186.863 | 0.27 | | | 37.48 |
| 12 | 52.482 | 2.00 | 1.83400 | 37.2 | 37.75 |
| 13 | 30.253 | 9.70 | 1.58913 | 61.1 | 36.31 |
| 14 | 121.982 | 0.20 | | | 35.59 |
| 15 | 83.784 | 9.35 | 1.76385 | 48.5 | 35.55 |

[Numerical Value Embodiment 3]
[Unit mm]

| | | | | | |
|---|---|---|---|---|---|
| 16 | −66.086 | (variable) | | | 34.42 |
| 17 | 124.244 | 1.10 | 1.83481 | 42.7 | 24.82 |
| 18 | 24.292 | 4.63 | | | 22.41 |
| 19 | −71.221 | 1.00 | 1.49700 | 81.5 | 22.03 |
| 20 | 71.659 | 0.20 | | | 22.91 |
| 21 | 38.178 | 3.63 | 2.00100 | 29.1 | 23.70 |
| 22 | −291.866 | 2.69 | | | 23.67 |
| 23 | −49.564 | 1.00 | 1.76385 | 48.5 | 23.47 |
| 24 | 181.291 | (variable) | | | 23.85 |
| 25 | −427.910 | 1.00 | 1.89190 | 37.1 | 24.78 |
| 26 | 185.647 | 1.41 | 1.75520 | 27.5 | 25.12 |
| 27 | 3156.972 | (variable) | | | 25.36 |
| 28(stop) | ∞ | 1.00 | | | 25.57 |
| 29* | 43.340 | 4.96 | 1.76385 | 48.5 | 26.85 |
| 30 | 5154.560 | (variable) | | | 26.82 |
| 31 | 90.473 | 5.30 | 1.76385 | 48.5 | 26.64 |
| 32 | −68.543 | 4.36 | | | 26.23 |
| 33 | 46.966 | 5.51 | 1.51742 | 52.4 | 22.37 |
| 34 | −54.746 | 1.20 | 2.00069 | 25.5 | 21.97 |
| 35 | 30.251 | 3.75 | | | 21.98 |
| 36 | 25.649 | 8.56 | 1.59522 | 67.7 | 27.43 |
| 37 | −46.290 | 0.54 | | | 27.41 |
| 38 | −121.617 | 1.20 | 2.00069 | 25.5 | 26.65 |
| 39 | 21.562 | 7.81 | 1.92286 | 18.9 | 26.12 |
| 40 | −95.265 | 3.58 | | | 26.04 |
| 41 | −45.578 | 7.10 | 1.49700 | 81.5 | 25.17 |
| 42 | −15.623 | 1.10 | 2.00330 | 28.3 | 25.13 |
| 43 | −41.472 | 30.08 | | | 28.09 |
| Image plane | ∞ | | | | |

Aspheric surface data

1st surface

K = 0.00000e+000
A4 = 3.92142e−006
A6 = −1.42944e−009
A8 = 1.03765e−012
A10 = −4.26574e−016
A12 = 2.95516e−019
A14 = −9.69561e−023
A16 = 1.48551e−026

8th surface

K = 0.00000e+000
A4 = 9.39991e−007
A6 = −1.37546e−009
A8 = −1.78506e−012
A10 = 3.11513e−015
A12 = −3.24608e−018

29th surface

K = 0.00000e+000
A4 = −4.58249e−006
A6 = −1.68643e−009
A8 = 6.24194e−013

Various data
Zoom ratio 1.70

| | Wide angle | Middle | Telephoto |
|---|---|---|---|
| Focal length | 20.60 | 27.00 | 35.00 |
| F-number | 2.90 | 2.90 | 2.90 |
| Half angle of view | 46.40 | 38.71 | 31.72 |
| Image height | 21.64 | 21.64 | 21.64 |
| Total lens length | 216.08 | 216.08 | 216.08 |
| BF | 30.08 | 30.08 | 30.08 |
| d16 | 1.00 | 12.53 | 21.93 |
| d24 | 16.38 | 4.53 | 2.00 |
| d27 | 0.52 | 4.84 | 1.30 |
| d30 | 12.32 | 8.33 | 5.00 |
| Entrance pupil position | 28.70 | 31.39 | 34.00 |
| Exit pupil position | −39.08 | −35.77 | −33.22 |
| Front principal point position | 43.16 | 47.32 | 49.65 |
| Rear principal point position | 9.48 | 3.08 | −4.92 |

Zoom lens unit data

| Unit | Start surface | Focal length | Lens structure length | Front principal point position | Rear principal point position |
|---|---|---|---|---|---|
| 1 | 1 | 34.51 | 83.16 | 45.46 | 50.85 |
| 2 | 17 | −30.61 | 14.24 | 3.50 | −6.71 |
| 3 | 25 | −325.45 | 2.41 | 0.23 | −1.10 |
| 4 | 28 | 56.92 | 5.96 | 0.98 | −2.83 |
| 5 | 31 | 83.86 | 50.00 | −22.41 | −44.91 |

[Numerical Value Embodiment 4]
[Unit mm]

Surface data

| Surface number | r | d | nd | vd | Effective diameter |
|---|---|---|---|---|---|
| 1* | 185.535 | 2.40 | 1.80100 | 35.0 | 63.36 |
| 2 | 36.012 | 16.19 | | | 52.61 |
| 3 | −93.441 | 1.70 | 1.58913 | 61.1 | 52.22 |
| 4 | 91.972 | 7.57 | | | 52.16 |
| 5 | 98.483 | 5.92 | 1.89286 | 20.4 | 54.88 |
| 6 | −21241.641 | 1.50 | | | 54.93 |
| 7 | 390.664 | 8.36 | 1.53775 | 74.7 | 55.36 |
| 8* | −82.580 | 0.50 | | | 55.65 |
| 9 | −85.289 | 1.80 | 1.84666 | 23.8 | 55.54 |
| 10 | −107.302 | 9.09 | | | 56.10 |
| 11 | 82.904 | 2.00 | 1.85478 | 24.8 | 55.00 |
| 12 | 41.897 | 11.24 | 1.49700 | 81.5 | 52.72 |
| 13 | 3991.231 | 0.27 | | | 52.61 |
| 14 | 93.947 | 8.68 | 1.65160 | 58.5 | 52.30 |
| 15 | −116.760 | (variable) | | | 51.73 |
| 16 | 82.747 | 1.10 | 1.83481 | 42.7 | 31.27 |
| 17 | 28.816 | 6.44 | | | 28.46 |
| 18 | −61.117 | 1.00 | 1.49700 | 81.5 | 27.80 |
| 19 | 123.530 | 0.20 | | | 27.72 |
| 20 | 45.043 | 4.01 | 2.00100 | 29.1 | 28.59 |
| 21 | −568.712 | 3.02 | | | 28.43 |
| 22 | −60.379 | 1.00 | 1.76385 | 48.5 | 28.03 |
| 23 | 99.570 | (variable) | | | 28.25 |
| 24 | −157.832 | 1.00 | 1.83400 | 37.2 | 29.12 |
| 25 | 188.934 | 1.68 | 1.84666 | 23.8 | 29.72 |
| 26 | −1334.794 | (variable) | | | 29.99 |
| 27* | 57.043 | 4.16 | 1.76385 | 48.5 | 31.94 |
| 28 | −236.133 | 1.00 | | | 32.00 |
| 29(stop) | ∞ | (variable) | | | 31.95 |
| 30 | 149.310 | 3.79 | 1.76385 | 48.5 | 31.47 |
| 31 | −85.676 | 6.53 | | | 31.31 |
| 32 | 64.450 | 5.36 | 1.51742 | 52.4 | 26.60 |
| 33 | −36.969 | 1.20 | 2.00069 | 25.5 | 25.81 |
| 34 | 51.586 | 7.86 | | | 25.03 |
| 35 | 64.191 | 6.82 | 1.59522 | 67.7 | 31.80 |
| 36 | −41.263 | 0.54 | | | 32.21 |
| 37 | −57.505 | 1.20 | 2.00069 | 25.5 | 32.09 |
| 38 | 335.260 | 5.09 | 1.92286 | 18.9 | 33.07 |
| 39 | −45.741 | 15.00 | | | 33.47 |
| 40 | −34.511 | 3.64 | 1.49700 | 81.5 | 30.25 |
| 41 | −23.285 | 1.10 | 2.00330 | 28.3 | 30.51 |
| 42 | −40.855 | 43.86 | | | 32.37 |
| Image plane | ∞ | | | | |

Aspheric surface data

1st surface

K = 0.00000e+000
A4 = 9.63850e−007

[Numerical Value Embodiment 4]
[Unit mm]

A6 = 1.93553e−011
A8 = −3.04028e−013
A10 = 2.71001e−016
A12 = −8.94254e−020
8th surface K = 0.00000e+000
A4 = 3.67188e−007
A6 = −6.33313e−011
A8 = −1.27078e−013
A10 = 9.05153e−017
A12 = −3.47009e−020
27th surface K = 0.00000e+000
A4 = −2.63332e−006
A6 = 3.61097e−011
A8 = −4.31261e−013

Various data
Zoom ratio 2.36

|  | Wide angle | Middle | Telephoto |
|---|---|---|---|
| Focal length | 28.85 | 45.00 | 68.00 |
| F-number | 2.90 | 2.90 | 2.90 |
| Half angle of view | 36.87 | 25.68 | 17.65 |
| Image height | 21.64 | 21.64 | 21.64 |
| Total lens length | 250.04 | 250.04 | 250.04 |
| BF | 43.86 | 43.86 | 43.86 |
| d15 | 1.00 | 23.79 | 40.08 |
| d23 | 28.42 | 6.73 | 2.00 |
| d26 | 1.84 | 8.54 | 2.65 |
| d29 | 14.97 | 7.16 | 1.50 |
| Entrance pupil position | 38.64 | 50.42 | 62.78 |
| Exit pupil position | −62.79 | −52.52 | −46.10 |
| Front principal point position | 59.69 | 74.41 | 79.38 |
| Rear principal point position | 15.01 | −1.14 | −24.14 |

Zoom lens unit data

| Unit | Start surface | Focal length | Lens structure length | Front principal point position | Rear principal point position |
|---|---|---|---|---|---|
| 1 | 1 | 57.83 | 77.22 | 56.10 | 50.81 |
| 2 | 16 | −34.67 | 16.76 | 5.97 | −6.24 |
| 3 | 24 | −217.92 | 2.68 | −0.21 | −1.66 |
| 4 | 27 | 60.23 | 5.16 | 0.46 | −2.91 |
| 5 | 30 | 99.99 | 58.14 | 1.69 | −42.81 |

[Numerical Value Embodiment 5]
[Unit mm]

Surface data

| Surface number | r | d | nd | vd | Effective diameter |
|---|---|---|---|---|---|
| 1* | 140.862 | 2.40 | 1.76385 | 48.5 | 63.21 |
| 2 | 25.512 | 18.09 |  |  | 45.69 |
| 3 | −90.338 | 1.65 | 1.76385 | 48.5 | 44.70 |
| 4 | 43.377 | 5.26 |  |  | 42.57 |
| 5 | 65.759 | 7.63 | 1.85478 | 24.8 | 44.49 |
| 6 | −328.127 | 1.50 |  |  | 44.28 |
| 7 | 503.309 | 6.73 | 1.53775 | 74.7 | 43.62 |
| 8* | −74.589 | 4.33 |  |  | 43.05 |
| 9 | −161.818 | 1.50 | 1.80000 | 29.8 | 41.57 |
| 10 | 47.169 | 11.10 | 1.49700 | 81.5 | 41.46 |
| 11 | −217.018 | 0.27 |  |  | 42.45 |
| 12 | 82.098 | 2.00 | 1.83400 | 37.2 | 43.23 |
| 13 | 36.107 | 12.30 | 1.58913 | 61.1 | 42.34 |
| 14 | −662.386 | 0.20 |  |  | 42.59 |
| 15 | 99.199 | 10.33 | 1.76385 | 48.5 | 42.71 |
| 16 | −77.444 | (variable) |  |  | 41.85 |
| 17 | 108.594 | 1.10 | 1.83481 | 42.7 | 24.08 |
| 18 | 27.864 | 4.01 |  |  | 22.65 |
| 19 | −122.364 | 1.00 | 1.49700 | 81.5 | 22.93 |
| 20 | 73.758 | 0.20 |  |  | 23.53 |
| 21 | 38.321 | 3.41 | 2.00100 | 29.1 | 24.20 |
| 22 | 1409.012 | 2.66 |  |  | 24.07 |
| 23 | −65.791 | 1.00 | 1.76385 | 48.5 | 23.84 |
| 24 | 95.286 | (variable) |  |  | 24.06 |
| 25 | −351.921 | 1.00 | 1.89190 | 37.1 | 24.63 |
| 26 | 219.982 | 1.27 | 1.71736 | 29.5 | 24.96 |
| 27 | 880.637 | (variable) |  |  | 25.20 |
| 28(stop) | ∞ | 1.83 |  |  | 25.52 |
| 29* | 47.118 | 3.62 | 1.69680 | 55.5 | 27.18 |
| 30 | −388.017 | (variable) |  |  | 27.23 |
| 31 | 122.584 | 4.90 | 1.76385 | 48.5 | 27.25 |
| 32 | −82.436 | 11.27 |  |  | 26.97 |
| 33 | 58.602 | 6.74 | 1.51742 | 52.4 | 26.74 |
| 34 | −41.831 | 1.20 | 2.00069 | 25.5 | 26.43 |
| 35 | 42.110 | 0.20 |  |  | 26.90 |
| 36 | 27.618 | 8.87 | 1.59522 | 67.7 | 29.15 |
| 37 | −50.372 | 0.54 |  |  | 29.22 |
| 38 | −274.585 | 1.20 | 2.00069 | 25.5 | 28.45 |
| 39 | 21.399 | 8.69 | 1.92286 | 18.9 | 27.72 |
| 40 | −88.829 | 2.00 |  |  | 27.59 |
| 41 | −139.461 | 7.29 | 1.49700 | 81.5 | 26.61 |
| 42 | −16.982 | 1.10 | 2.00330 | 28.3 | 26.27 |
| 43 | −72.131 | 29.39 |  |  | 28.83 |
| Image plane | ∞ |  |  |  |  |

Aspheric surface data

1st surface

K = 0.00000e+000
A4 = 4.60605e−006
A6 = −2.43862e−009
A8 = 1.65832e−012
A10 = −6.46105e−016
A12 = 2.41181e−019
A14 = −9.69561e−023
A16 = 1.48551e−026
8th surface K = 0.00000e+000
A4 = 5.88112e−007
A6 = −1.21534e−009
A8 = −1.57029e−012
A10 = 1.79328e−015
A12 = −9.42142e−019
29th surface K = 0.00000e+000
A4 = −3.69192e−006
A6 = −4.35760e−010
A8 = 2.71966e−013

Various data
Zoom ratio 1.83

|  | Wide angle | Middle | Telephoto |
|---|---|---|---|
| Focal length | 18.60 | 25.00 | 34.00 |
| F-number | 2.90 | 2.90 | 2.90 |
| Half angle of view | 49.31 | 40.87 | 32.47 |
| Image height | 21.64 | 21.64 | 21.64 |
| Total lens length | 230.01 | 230.01 | 230.01 |
| BF | 29.39 | 29.39 | 29.39 |

-continued

| | | | |
|---|---|---|---|
| d16 | 1.00 | 18.73 | 34.49 |
| d24 | 17.33 | 4.65 | 2.00 |
| d27 | 0.59 | 4.92 | 1.30 |
| d30 | 21.34 | 11.96 | 2.47 |
| Entrance pupil position | 26.56 | 29.67 | 33.44 |
| Exit pupil position | −45.90 | −37.62 | −30.89 |
| Front principal point position | 40.56 | 45.34 | 48.26 |
| Rear principal point position | 10.79 | 4.39 | −4.61 |

Zoom lens unit data

| Unit | Start surface | Focal length | Lens structure length | Front principal point position | Rear principal point position |
|---|---|---|---|---|---|
| 1 | 1 | 40.98 | 85.28 | 49.88 | 74.03 |
| 2 | 17 | −35.53 | 13.37 | 4.48 | −5.09 |
| 3 | 25 | −239.86 | 2.27 | 0.35 | −0.91 |
| 4 | 28 | 60.25 | 5.44 | 2.06 | −1.91 |
| 5 | 31 | 76.73 | 54.00 | −25.79 | −46.31 |

[Numerical Value Embodiment 6]
[Unit mm]

Surface data

| Surface number | r | d | nd | vd | Effective diameter |
|---|---|---|---|---|---|
| 1 | −187.659 | 2.80 | 1.74951 | 35.3 | 90.32 |
| 2 | 143.818 | 1.80 | | | 85.04 |
| 3 | 147.158 | 5.16 | 1.95906 | 17.5 | 84.77 |
| 4 | 303.603 | 5.74 | | | 84.07 |
| 5 | 1537.645 | 9.45 | 1.60311 | 60.6 | 82.59 |
| 6* | −142.756 | 10.81 | | | 81.81 |
| 7 | 170.407 | 2.50 | 1.84666 | 23.8 | 75.25 |
| 8 | 87.795 | 8.94 | 1.43875 | 94.7 | 74.12 |
| 9 | 574.352 | 6.93 | | | 74.20 |
| 10 | 129.205 | 10.24 | 1.43387 | 95.1 | 75.53 |
| 11 | −264.982 | 0.20 | | | 75.33 |
| 12 | 72.135 | 9.53 | 1.59522 | 67.7 | 71.85 |
| 13 | 310.034 | (variable) | | | 70.70 |
| 14 | 144.969 | 0.95 | 1.75500 | 52.3 | 27.16 |
| 15 | 19.033 | (variable) | | | 23.09 |
| 16 | −33.065 | 0.75 | 1.49700 | 81.5 | 23.25 |
| 17 | 85.153 | 5.79 | 1.80000 | 29.8 | 24.64 |
| 18 | −27.252 | 1.16 | | | 25.11 |
| 19 | −22.927 | 1.00 | 1.76385 | 48.5 | 24.89 |
| 20* | −285.604 | (variable) | | | 26.30 |
| 21 | −70.473 | 4.16 | 1.80810 | 22.8 | 31.34 |
| 22 | −32.621 | 1.00 | 1.90525 | 35.0 | 32.03 |
| 23 | −154.205 | (variable) | | | 33.90 |
| 24(stop) | ∞ | 0.89 | | | 35.25 |
| 25* | 70.399 | 7.30 | 1.59522 | 67.7 | 37.23 |
| 26 | −59.092 | 0.18 | | | 37.69 |
| 27 | 3853.854 | 1.10 | 1.85478 | 24.8 | 37.55 |
| 28 | 124.194 | 3.70 | 1.48749 | 70.2 | 37.48 |
| 29 | −275.184 | (variable) | | | 37.55 |
| 30 | 61.945 | 1.20 | 2.00100 | 29.1 | 37.51 |
| 31 | 44.184 | 1.34 | | | 36.78 |
| 32 | 44.314 | 6.25 | 1.48749 | 70.2 | 37.19 |
| 33 | −454.249 | 42.86 | | | 36.97 |
| 34 | 426.690 | 7.89 | 1.43875 | 94.7 | 38.19 |
| 35 | −45.145 | 0.85 | | | 38.20 |
| 36 | 202.166 | 9.07 | 1.80810 | 22.8 | 35.65 |
| 37 | −30.268 | 0.90 | 1.95375 | 32.3 | 34.76 |
| 38 | 239.672 | 0.80 | | | 33.52 |
| 39 | 56.832 | 9.11 | 1.48749 | 70.2 | 32.96 |
| 40 | −34.607 | 1.00 | 2.00100 | 29.1 | 32.03 |
| 41 | 55.336 | 0.91 | | | 32.27 |
| 42 | 46.280 | 8.05 | 1.64769 | 33.8 | 33.55 |
| 43 | −87.145 | 44.16 | | | 33.88 |
| Image plane | ∞ | | | | |

[Numerical Value Embodiment 6]
[Unit mm]

Aspheric surface data

6th surface

K = −1.36164e+001
A4 = −5.47820e−007
A6 = 1.69183e−010
A8 = −6.27547e−014
A10 = 1.86301e−017
A12 = −2.68042e−021

20th surface

K = −1.44049e+003
A4 = −1.54898e−005
A6 = 4.39167e−008
A8 = −2.59856e−010
A10 = 8.04212e−013
A12 = −1.14217e−015

25th surface

K = −1.29956e+000
A4 = −2.63459e−006
A6 = 1.05204e−009
A8 = −2.81904e−013
A10 = −1.13316e−015
A12 = 1.48187e−018

Various data
Zoom ratio 9.62

| | | | | |
|---|---|---|---|---|
| Focal length | 25.99 | 80.00 | 152.70 | 250.00 |
| F-number | 2.74 | 2.73 | 2.73 | 3.67 |
| Half angle of view | 29.65 | 10.48 | 5.54 | 3.39 |
| Image height | 14.80 | 14.80 | 14.80 | 14.80 |
| Total lens length | 313.70 | 313.70 | 313.70 | 313.70 |
| BF | 44.16 | 44.16 | 44.16 | 44.16 |
| d13 | 0.99 | 39.96 | 53.81 | 59.68 |
| d15 | 7.07 | 8.12 | 8.49 | 8.65 |
| d20 | 53.85 | 2.88 | 2.72 | 2.44 |
| d23 | 1.14 | 18.49 | 10.95 | 1.00 |
| d29 | 14.16 | 7.77 | 1.25 | 5.45 |
| Entrance pupil position | 72.41 | 189.18 | 328.51 | 409.12 |
| Exit pupil position | −139.24 | −120.02 | −104.13 | −114.00 |
| Front principal point position | 94.72 | 230.19 | 323.96 | 263.95 |
| Rear principal point position | 18.17 | −35.84 | −108.54 | −205.84 |

Zoom lens unit data

| Unit | Start surface | Focal length | Lens structure length | Front principal point position | Rear principal point position |
|---|---|---|---|---|---|
| 1 | 1 | 88.22 | 74.11 | 49.44 | 0.97 |
| 2 | 14 | −28.98 | 0.95 | 0.62 | 0.08 |
| 3 | 16 | −83.53 | 8.71 | 2.75 | −2.50 |
| 4 | 21 | −118.19 | 5.16 | −1.18 | −4.04 |
| 5 | 24 | 58.21 | 13.17 | 3.51 | −5.33 |
| 6 | 30 | 101.48 | 90.22 | 22.81 | −54.94 |

[Numerical Value Embodiment 7]
[Unit mm]

Surface data

| Surface number | r | d | nd | vd | Effective diameter |
|---|---|---|---|---|---|
| 1* | 256.003 | 3.77 | 1.80100 | 35.0 | 79.92 |
| 2 | 38.263 | 21.87 | | | 61.97 |
| 3 | −97.467 | 2.40 | 1.64000 | 60.1 | 61.56 |

[Numerical Value Embodiment 7]
[Unit mm]

| | | | | | |
|---|---|---|---|---|---|
| 4 | 183.261 | 2.91 | | | 61.95 |
| 5 | 107.016 | 6.41 | 1.89286 | 20.4 | 63.43 |
| 6 | 1256.832 | 1.50 | | | 63.14 |
| 7 | 362.203 | 11.34 | 1.53775 | 74.7 | 63.67 |
| 8* | −72.594 | 5.13 | | | 64.04 |
| 9 | −88.137 | 2.40 | 1.83400 | 37.2 | 62.15 |
| 10 | −164.636 | 0.20 | | | 63.09 |
| 11 | 117.221 | 2.69 | 1.85478 | 24.8 | 63.22 |
| 12 | 53.665 | 11.21 | 1.43875 | 94.7 | 61.43 |
| 13 | 885.689 | 0.27 | | | 61.71 |
| 14 | 142.405 | 8.50 | 1.76385 | 48.5 | 62.44 |
| 15 | −160.981 | (variable) | | | 62.30 |
| 16 | −2392.548 | 8.01 | 1.53775 | 74.7 | 56.71 |
| 17 | −98.279 | (variable) | | | 55.56 |
| 18* | −103.708 | 1.75 | 1.59522 | 67.7 | 35.07 |
| 19 | 50.998 | 5.19 | | | 31.40 |
| 20 | −72.795 | 1.21 | 1.43875 | 94.7 | 30.70 |
| 21 | 101.257 | 2.22 | 1.85478 | 24.8 | 29.55 |
| 22 | 309.355 | (variable) | | | 29.12 |
| 23 | −66.962 | 1.21 | 1.77250 | 49.6 | 27.56 |
| 24 | 98.074 | 1.79 | 1.80810 | 22.8 | 28.71 |
| 25 | 369.609 | (variable) | | | 29.01 |
| 26(stop) | ∞ | 1.35 | | | 29.65 |
| 27* | 57.860 | 4.74 | 1.69680 | 55.5 | 31.77 |
| 28 | −108.296 | (variable) | | | 31.99 |
| 29 | 78.011 | 4.35 | 1.76385 | 48.5 | 32.18 |
| 30 | −110.130 | 0.27 | | | 31.94 |
| 31 | 80.673 | 6.11 | 1.48749 | 70.2 | 30.40 |
| 32 | −38.048 | 1.61 | 2.00069 | 25.5 | 29.60 |
| 33 | 75.769 | 9.79 | | | 30.20 |
| 34 | 82.145 | 7.62 | 1.58913 | 61.1 | 37.08 |
| 35 | −46.135 | 0.54 | | | 37.41 |
| 36 | 418.098 | 5.65 | 1.95906 | 17.5 | 36.50 |
| 37 | −61.960 | 1.21 | 1.89190 | 37.1 | 36.15 |
| 38 | −260.234 | 17.12 | | | 35.59 |
| 39 | −97.408 | 5.29 | 1.43875 | 94.7 | 28.01 |
| 40 | −22.806 | 1.35 | 2.00330 | 28.3 | 27.66 |
| 41 | 61.181 | 0.94 | | | 29.82 |
| 42 | 48.816 | 6.45 | 1.59522 | 67.7 | 32.38 |
| 43 | −66.688 | 29.99 | | | 33.01 |
| Image plane | ∞ | | | | |

Aspheric surface data

1st surface

K = 0.00000e+000
A4 = 8.24631e−007
A6 = 1.27031e−011
A8 = −5.44726e−014
A10 = 2.10763e−017
A12 = −3.26112e−021

8th surface

K = 0.00000e+000
A4 = 5.63194e−007
A6 = −2.33714e−011
A8 = −4.23220e−014
A10 = 1.43638e−018
A12 = −5.10601e−021

18th surface

K = 0.00000e+000
A4 = 1.30900e−006
A6 = −3.23859e−009
A8 = 1.49679e−011
A10 = −4.01903e−014
A12 = 3.92673e−017

27th surface

K = 0.00000e+000
A4 = −3.31989e−006
A6 = 8.84718e−010
A8 = −5.65991e−014

Various data
Zoom ratio 2.82

| | Wide angle | Middle | Telephoto |
|---|---|---|---|
| Focal length | 24.80 | 45.00 | 70.00 |
| F-number | 2.90 | 2.90 | 2.90 |
| Half angle of view | 41.10 | 25.68 | 17.17 |
| Image height | 21.64 | 21.64 | 21.64 |
| Total lens length | 275.04 | 275.04 | 275.04 |
| BF | 29.99 | 29.99 | 29.99 |
| d15 | 0.88 | 7.17 | 10.93 |
| d17 | 0.89 | 32.53 | 51.49 |
| d22 | 38.38 | 12.60 | 3.44 |
| d25 | 2.73 | 4.29 | 1.30 |
| d28 | 25.78 | 12.08 | 1.50 |
| Entrance pupil position | 41.77 | 58.43 | 72.90 |
| Exit pupil position | −58.11 | −46.11 | −39.04 |
| Front principal point position | 59.59 | 76.82 | 71.92 |
| Rear principal point position | 5.19 | −15.01 | −40.01 |

Zoom lens unit data

| Unit | Start surface | Focal length | Lens structure length | Front principal point position | Rear principal point position |
|---|---|---|---|---|---|
| 1 | 1 | 200.06 | 80.60 | 127.14 | 185.05 |
| 2 | 16 | 189.75 | 8.01 | 5.42 | 0.22 |
| 3 | 18 | −44.07 | 10.37 | 1.96 | −6.21 |
| 4 | 23 | −74.47 | 3.00 | 0.25 | −1.41 |
| 5 | 26 | 54.53 | 6.08 | 2.33 | −1.84 |
| 6 | 29 | 79.25 | 68.31 | −28.91 | −56.96 |

[Numerical Value Embodiment 8]
[Unit mm]

Surface data

| Surface number | r | d | nd | vd | Effective diameter |
|---|---|---|---|---|---|
| 1* | 1369.886 | 2.50 | 1.83481 | 42.7 | 80.30 |
| 2 | 31.980 | 16.67 | | | 56.63 |
| 3* | 176.286 | 2.00 | 1.83481 | 42.7 | 55.99 |
| 4 | 87.278 | 10.14 | | | 53.75 |
| 5 | −92.733 | 1.80 | 1.83481 | 42.7 | 53.20 |
| 6 | −1060.660 | 0.15 | | | 53.88 |
| 7 | 98.842 | 4.66 | 1.92286 | 18.9 | 54.72 |
| 8 | 418.321 | 4.30 | | | 54.42 |
| 9 | 208.415 | 7.58 | 1.60300 | 65.4 | 53.27 |
| 10* | −104.786 | 4.41 | | | 52.61 |
| 11 | −1060.098 | 8.76 | 1.43387 | 95.1 | 52.53 |
| 12 | −54.638 | 0.30 | | | 53.10 |
| 13 | −54.809 | 1.70 | 1.80000 | 29.8 | 53.06 |
| 14 | −108.956 | 0.18 | | | 55.17 |
| 15 | 158.476 | 1.70 | 1.91650 | 31.6 | 57.34 |
| 16 | 58.403 | 13.34 | 1.43875 | 94.7 | 57.31 |
| 17 | −136.985 | 0.40 | | | 58.38 |
| 18 | 1471.602 | 8.95 | 1.43387 | 95.1 | 59.88 |
| 19 | −70.914 | 0.40 | | | 60.36 |
| 20 | 116.211 | 8.03 | 1.76385 | 48.5 | 59.96 |
| 21 | −193.948 | (variable) | | | 59.51 |
| 22 | 177.355 | 0.70 | 2.00100 | 29.1 | 22.42 |
| 23 | 20.620 | 3.80 | | | 20.24 |
| 24 | −72.986 | 0.70 | 1.43875 | 94.7 | 20.09 |
| 25 | 72.121 | 2.19 | | | 19.76 |
| 26 | −229.294 | 5.55 | 1.85478 | 24.8 | 19.63 |
| 27 | −16.141 | 0.70 | 1.88300 | 40.8 | 19.59 |
| 28 | 127.945 | 0.27 | | | 19.62 |
| 29 | 41.030 | 2.83 | 1.64769 | 33.8 | 19.78 |
| 30 | −215.738 | (variable) | | | 19.63 |
| 31 | −35.014 | 0.80 | 1.72916 | 54.7 | 19.90 |
| 32 | 44.290 | 2.42 | 1.84666 | 23.8 | 21.01 |
| 33 | 396.716 | (variable) | | | 21.35 |
| 34(stop) | ∞ | 1.00 | | | 26.61 |
| 35* | 73.671 | 5.03 | 1.58913 | 61.1 | 27.81 |

-continued

[Numerical Value Embodiment 8]
[Unit mm]

| | | | | | |
|---|---|---|---|---|---|
| 36 | −122.249 | 0.50 | | | 28.47 |
| 37 | 71.375 | 4.59 | 1.48749 | 70.2 | 29.05 |
| 38 | −1079.692 | (variable) | | | 29.05 |
| 39 | 74.723 | 6.00 | 1.63980 | 34.5 | 28.49 |
| 40 | −66.536 | 6.41 | | | 27.99 |
| 41 | −111.329 | 0.90 | 1.88300 | 40.8 | 23.80 |
| 42 | 21.005 | 6.67 | 1.48749 | 70.2 | 22.87 |
| 43 | −208.145 | 0.50 | | | 23.37 |
| 44 | 44.431 | 8.11 | 1.43875 | 94.7 | 24.32 |
| 45 | −22.238 | 0.90 | 2.00100 | 29.1 | 24.54 |
| 46 | −47.166 | 0.50 | | | 25.70 |
| 47 | 103.238 | 5.83 | 1.48749 | 70.2 | 26.52 |
| 48 | −30.640 | 4.00 | | | 26.69 |
| 49 | ∞ | 33.00 | 1.60859 | 46.4 | 40.00 |
| 50 | ∞ | 13.20 | 1.51680 | 64.2 | 40.00 |
| 51 | ∞ | 7.45 | | | 40.00 |
| Image plane | ∞ | | | | |

Aspheric surface data

1st surface

K = 0.00000e+000
A4 = 3.20016e−006
A6 = 1.07610e−008
A8 = 7.68367e−012
A10 = 9.50211e−014
A12 = 1.11170e−016
A14 = 1.85027e−020
A16 = −5.47558e−026
A3 = 1.55794e−005
A5 = −1.32700e−007
A7 = −3.22687e−010
A9 = −1.17217e−012
A11 = −4.11328e−015
A13 = −1.90044e−018
A15 = −7.32907e−023
3rd surface K = 0.00000e+000
A4 = −2.25651e−006
A6 = −7.36014e−008
A8 = −7.12145e−010
A10 = −3.21738e−013
A12 = 1.59814e−015
A14 = −6.53014e−019
A16 = −2.02833e−022
A3 = −1.22350e−005
A5 = 4.21309e−007
A7 = 9.09915e−009
A9 = 3.03359e−011
A11 = −3.27059e−014
A13 = −1.78508e−017
A15 = 2.22652e−020
10th surface K = 0.00000e+000
A4 = 8.91209e−007
A6 = 1.41946e−008
A8 = 2.70879e−010
A10 = 2.08398e−013
A12 = −7.68929e−016
A14 = 1.05336e−018
A16 = 2.20104e−022
A3 = −2.80741e−006
A5 = −2.59195e−008
A7 = −2.66212e−009
A9 = −1.44093e−011
A11 = 1.68271e−014
A13 = −4.83521e−018
A15 = −2.64570e−020
35th surface K = −9.42308e+000
A4 = −7.64130e−007

-continued

[Numerical Value Embodiment 8]
[Unit mm]

A6 = −9.77139e−010
A8 = −1.47231e−012

Various data
Zoom ratio 13.60

| | | | | |
|---|---|---|---|---|
| Focal length | 4.43 | 16.00 | 35.73 | 60.25 |
| F-number | 1.86 | 1.86 | 1.86 | 2.78 |
| Half angle of view | 51.15 | 18.97 | 8.75 | 5.22 |
| Image height | 5.50 | 5.50 | 5.50 | 5.50 |
| Total lens length | 315.65 | 315.65 | 315.65 | 315.65 |
| BF | 7.45 | 7.45 | 7.45 | 7.45 |
| d21 | 0.65 | 39.84 | 52.90 | 57.13 |
| d30 | 37.18 | 2.74 | 3.63 | 5.75 |
| d33 | 16.56 | 19.22 | 11.16 | 1.39 |
| d38 | 38.77 | 31.35 | 25.46 | 28.88 |
| Entrance pupil position | 29.50 | 49.65 | 79.66 | 97.28 |
| Exit pupil position | 157.59 | 264.32 | 603.03 | 344.68 |
| Front principal point position | 34.06 | 66.65 | 117.53 | 168.29 |
| Rear principal point position | 3.02 | −8.55 | −28.28 | −52.80 |

Zoom lens unit data

| Unit | Start surface | Focal length | Lens structure length | Front principal point position | Rear principal point position |
|---|---|---|---|---|---|
| 1 | 1 | 30.93 | 97.95 | 45.19 | 48.22 |
| 2 | 22 | −21.83 | 16.74 | −0.57 | −13.72 |
| 3 | 31 | −49.15 | 3.22 | 0.12 | −1.64 |
| 4 | 34 | 50.53 | 11.12 | 3.19 | −4.62 |
| 5 | 39 | 51.36 | 86.02 | 22.31 | −42.43 |

[Numerical Value Embodiment 9]
[Unit mm]

Surface data

| Surface number | r | d | nd | vd | Effective diameter |
|---|---|---|---|---|---|
| 1 | −245.443 | 2.80 | 1.74951 | 35.3 | 88.34 |
| 2 | 142.847 | 2.55 | | | 84.09 |
| 3 | 164.431 | 4.75 | 1.95906 | 17.5 | 83.91 |
| 4 | 339.908 | 10.88 | | | 83.32 |
| 5 | 259.698 | 10.96 | 1.60311 | 60.6 | 79.99 |
| 6* | −178.143 | 7.25 | | | 80.08 |
| 7 | −2900.252 | 2.50 | 1.84666 | 23.8 | 79.96 |
| 8 | 199.483 | 6.75 | 1.43875 | 94.7 | 79.32 |
| 9 | −906.457 | 0.20 | | | 79.32 |
| 10 | 136.512 | 13.25 | 1.43387 | 95.1 | 79.01 |
| 11 | −144.424 | 0.20 | | | 78.59 |
| 12 | 70.623 | 7.02 | 1.59522 | 67.7 | 70.39 |
| 13 | 142.506 | (variable) | | | 68.98 |
| 14 | 157.580 | 0.95 | 1.75500 | 52.3 | 29.36 |
| 15 | 20.178 | 7.43 | | | 24.94 |
| 16 | −38.430 | 0.75 | 1.49700 | 81.5 | 24.28 |
| 17 | 57.623 | 5.72 | 1.80000 | 29.8 | 24.67 |
| 18 | −32.033 | 1.81 | | | 25.03 |
| 19 | −25.142 | 1.00 | 1.76385 | 48.5 | 24.64 |
| 20* | −601.105 | (variable) | | | 25.79 |
| 21 | −69.634 | 5.98 | 1.80810 | 22.8 | 31.05 |
| 22 | −33.219 | 1.00 | 1.90525 | 35.0 | 32.43 |
| 23 | −156.846 | (variable) | | | 34.27 |
| 24(stop) | ∞ | 0.89 | | | 35.47 |
| 25* | 75.279 | 7.04 | 1.59522 | 67.7 | 37.32 |
| 26 | −62.309 | 0.18 | | | 37.77 |
| 27 | 1112.878 | 1.10 | 1.85478 | 24.8 | 37.69 |
| 28 | 121.863 | 3.65 | 1.48749 | 70.2 | 37.62 |
| 29 | −314.210 | (variable) | | | 37.69 |

-continued

[Numerical Value Embodiment 9]
[Unit mm]

| 30 | 55.133 | 1.20 | 2.00100 | 29.1 | 37.75 |
|---|---|---|---|---|---|
| 31 | 39.897 | 1.56 | | | 36.89 |
| 32 | 41.988 | 6.67 | 1.48749 | 70.2 | 37.36 |
| 33 | −338.273 | 42.86 | | | 37.16 |
| 34 | −1463.511 | 7.89 | 1.43875 | 94.7 | 38.34 |
| 35 | −41.635 | 0.72 | | | 38.44 |
| 36 | 263.568 | 9.83 | 1.80810 | 22.8 | 35.75 |
| 37 | −28.879 | 0.90 | 1.95375 | 32.3 | 34.71 |
| 38 | 530.108 | 0.17 | | | 33.62 |
| 39 | 58.815 | 8.93 | 1.48749 | 70.2 | 33.05 |
| 40 | −35.579 | 1.00 | 2.00100 | 29.1 | 32.07 |
| 41 | 54.993 | 1.32 | | | 32.16 |
| 42 | 46.746 | 7.90 | 1.64769 | 33.8 | 33.63 |
| 43 | −98.965 | 43.97 | | | 33.89 |
| Image plane | ∞ | | | | |

Aspheric surface data

6th surface

K = −1.81250e+001
A4 = −2.67859e−007
A6 = 1.20912e−010
A8 = −5.25367e−014
A10 = 2.18291 e−017
A12 = −4.24342e−021

20th surface

K = −9.34235e+003
A4 = −1.21512e−005
A6 = 2.75369e−008
A8 = −1.49954e−010
A10 = 3.78673e−013
A12 = −4.28245e−016

25th surface

K = −3.34012e−001
A4 = −2.50210e−006

-continued

[Numerical Value Embodiment 9]
[Unit mm]

A6 = 9.90164e−010
A8 = −1.32098e−012
A10 = 2.15696e−015
A12 = −1.76290e−018

Various data
Zoom ratio 9.62

| Focal length | 25.99 | 80.00 | 165.41 | 250.00 |
|---|---|---|---|---|
| F-number | 2.74 | 2.73 | 2.73 | 3.67 |
| Half angle of view | 29.65 | 10.48 | 5.11 | 3.39 |
| Image height | 14.80 | 14.80 | 14.80 | 14.80 |
| Total lens length | 315.58 | 315.58 | 315.58 | 315.58 |
| BF | 43.97 | 43.97 | 43.97 | 43.97 |
| d13 | 1.47 | 42.27 | 58.94 | 63.94 |
| d20 | 56.36 | 2.72 | 5.35 | 2.74 |
| d23 | 0.96 | 18.96 | 8.64 | 1.00 |
| d29 | 15.24 | 10.09 | 1.10 | 6.36 |
| Entrance pupil position | 70.67 | 188.25 | 360.39 | 419.06 |
| Exit pupil position | −141.18 | −125.22 | −103.11 | −115.29 |
| Front principal point position | 93.02 | 230.43 | 339.77 | 276.60 |
| Rear principal point position | 17.97 | −36.03 | −121.45 | −206.03 |

Zoom lens unit data

| Unit | Start surface | Focal length | Lens structure length | Front principal point position | Rear principal point position |
|---|---|---|---|---|---|
| 1 | 1 | 93.91 | 69.12 | 46.21 | 1.62 |
| 2 | 14 | −20.82 | 17.67 | 3.52 | −9.13 |
| 3 | 21 | −116.10 | 6.98 | −1.48 | −5.37 |
| 4 | 24 | 60.84 | 12.85 | 3.43 | −5.19 |
| 5 | 30 | 100.49 | 90.97 | 21.84 | −56.64 |

TABLE 1

| | | Numerical Value Embodiment | | | | | | | | |
|---|---|---|---|---|---|---|---|---|---|---|
| Conditional expression | | 1 | 2 | 3 | 4 | 5 | 6 | 7 | 8 | 9 |
| (1) | L1/LSP | 0.657 | 0.620 | 0.706 | 0.580 | 0.712 | 0.488 | 0.556 | 0.569 | 0.453 |
| (2) | Lspmax/Lspw | 1.306 | 1.367 | 1.212 | 1.241 | 1.546 | 1.166 | 1.378 | 1.179 | 1.169 |
| (3) | $\|1/\beta P\|$ | 0.049 | 0.061 | 0.088 | 0.099 | 0.011 | 0.014 | 0.057 | 0.029 | 0.001 |
| (4) | Lspt/Lspw | 1.306 | 1.367 | 1.212 | 1.241 | 1.546 | 1.112 | 1.378 | 1.133 | 1.106 |
| (5) | fp/fn | −1.002 | −1.107 | −0.175 | −0.276 | −0.251 | −0.492 | −0.732 | −1.028 | −0.524 |
| (6) | fl/fm | −1.075 | −1.723 | −1.127 | −1.668 | −1.153 | −4.455 | −3.422 | −1.417 | −4.511 |
| (7) | Mmax/L1 | 0.481 | 0.614 | 0.252 | 0.506 | 0.393 | 0.813 | 0.752 | 0.577 | 0.904 |
| | L1 | 103.446 | 102.383 | 83.165 | 77.222 | 85.279 | 74.110 | 80.601 | 97.949 | 69.116 |
| | LSP | 157.463 | 165.089 | 117.724 | 133.082 | 119.834 | 151.981 | 144.882 | 172.290 | 152.555 |
| | Lspmax | 70.570 | 85.738 | 41.879 | 69.326 | 53.432 | 90.789 | 88.561 | 87.647 | 97.580 |
| | Lspw | 54.017 | 62.706 | 34.559 | 55.860 | 34.555 | 77.872 | 64.282 | 74.341 | 83.439 |
| | βP | 20.220 | 16.505 | −11.331 | −10.126 | −91.708 | −72.488 | 17.433 | −34.455 | 1337.906 |
| | Lspt | 70.570 | 85.738 | 41.879 | 69.326 | 53.432 | 86.586 | 88.561 | 84.230 | 92.320 |
| | fp | 54.164 | 51.918 | 56.916 | 60.225 | 60.247 | 58.207 | 54.530 | 50.529 | 60.835 |
| | fn | −54.050 | 46.886 | −325.447 | −217.915 | −239.859 | −118.195 | −74.465 | −49.151 | −116.098 |
| | fl | 38.439 | 52.083 | 34.510 | 57.834 | 40.978 | 88.223 | 200.063 | 30.930 | 93.909 |
| | fm | −35.743 | −30.230 | −30.610 | −34.672 | −35.530 | −19.803 | −58.462 | −21.833 | −20.817 |
| | Mmax | 49.782 | 62.854 | 20.929 | ]39.083 | 33.497 | 60.269 | 60.651 | 56.482 | 62.473 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-149309, filed Aug. 16, 2019, which is hereby incorporated by reference herein in its entirety.

What is claimed is:

1. A zoom lens comprising in order from an object side to an image side:
   a first lens unit having a positive refractive power and configured not to move for zooming;
   one or two moving lens units including a lens unit having a negative refractive power, the one or two moving lens units being configured to move for zooming;
   a negative lens unit configured to move for zooming;
   a positive lens unit including an aperture stop and configured to move for zooming; and
   a final lens unit having a positive refractive power and configured not to move for zooming,
   wherein an interval between each pair of lens units adjacent to each other changes for zooming, and
   following conditional expressions are satisfied:

$0.4 < L1/LSP < 0.9;$ $1.1 < Lsp\mathrm{max}/Lspw < 1.8;$ and $-0.524 < fp/fn < -0.1,$ where L1 is a distance on an optical axis from a surface, closest to the object side, of the first lens unit to a surface, closest to an image side, of the first lens unit, LSP is a distance on the optical axis from the surface, closest to the object side, of the first lens unit to the aperture stop at a wide angle end, Lspw is a distance on the optical axis from the surface, closest to the image side, of the first lens unit to the aperture stop at the wide angle end, Lspmax is a maximum value of a distance on the optical axis from the surface, closest to the image side, of the first lens unit to the aperture stop, and fp and fn are a focal length of the positive lens unit and a focal length of the negative lens unit, respectively.

2. The zoom lens according to claim 1, wherein
   the first lens unit includes a negative first sub lens unit, a positive second sub lens unit, and a positive sub lens unit in order from the object side to the image side,
   an interval between each pair of sub lens units adjacent to each other changes for focusing, and
   at least the second sub lens unit moves for focusing.

3. The zoom lens according to claim 1, wherein a following conditional expression is satisfied:

$|1/\beta p| < 0.2,$ where βp is a lateral magnification of the positive lens unit at the wide angle end in a case where the zoom lens receives light from infinity.

4. The zoom lens according to claim 1, wherein a following conditional expression is satisfied:

$1.05 < Lspt/Lspw < 1.75$ (4), where Lspt is a distance on the optical axis from the surface, closest to the image side, of the first lens unit to the aperture stop at a telephoto end.

5. The zoom lens according to claim 1, wherein a following conditional expression is satisfied:

$-6.0 < f1/fm < -0.8,$ where f1 is a focal length of the first lens unit, and fm is a combined focal length of the one or two moving lens units at the wide angle end.

6. The zoom lens according to claim 1, wherein a following conditional expression is satisfied:

$0.15 < M\mathrm{max}/L1 < 1.00,$ where Mmax is a maximum value of an amount of movement of the one or two moving lens units for zooming from the wide angle end to a telephoto end.

7. An image pickup apparatus comprising:
   a zoom lens comprising in order from an object side to an image side:
      a first lens unit having a positive refractive power and configured not to move for zooming;
      one or two moving lens units including a lens unit having a negative refractive power, the one or two moving lens units being configured to move for zooming;
      a negative lens unit configured to move for zooming;
      a positive lens unit including an aperture stop and configured to move for zooming; and
      a final lens unit having a positive refractive power and configured not to move for zooming,
      wherein an interval between each pair of lens units adjacent to each other changes for zooming, and
      following conditional expressions are satisfied:

$0.4 < L1/LSP < 0.9;$ and $1.1 < Lsp\mathrm{max}/Lspw < 1.8,$ $-0.524 < fp/fn < -0.1,$ where L1 is a distance on an optical axis from a surface, closest to the object side, of the first lens unit to a surface, closest to the image side, of the first lens unit, LSP is a distance on the optical axis from the surface, closest to the object side, of the first lens unit to the aperture stop at a wide angle end, Lspw is a distance on the optical axis from the surface, closest to the image side, of the first lens unit to the aperture stop at the wide angle end, and Lspmax is a maximum value of a distance on the optical axis from the surface, closest to the image side, of the first lens unit to the aperture stop, and fp and fn are a focal length of the positive lens unit and a focal length of the negative lens unit, respectively; and
   an image pickup element configured to pick up an image formed by the zoom lens.

8. A zoom lens comprising in order from an object side to an image side:
   a first lens unit having a positive refractive power and configured not to move for zooming;
   one or two moving lens units including a lens unit having a negative refractive power, the one or two moving lens units being configured to move for zooming;
   a negative lens unit configured to move for zooming;
   a positive lens unit including an aperture stop and configured to move for zooming; and
   a final lens unit having a positive refractive power and configured not to move for zooming,
   wherein an interval between each pair of lens units adjacent to each other changes for zooming, and
   following conditional expressions are satisfied:

$0.4 < L1/LSP < 0.9;$ $1.1 < Lsp\mathrm{max}/Lspw < 1.8;$ and $-1.723 < f1/fn < -0.8,$ where L1 is a distance on an optical axis from a surface, closest to the object side, of the first lens unit to a surface, closest to an image side, of the first lens unit, LSP is a distance on the optical axis from the surface, closest to the object side, of the first lens unit to the aperture stop at a wide angle end, Lspw is a distance on the optical axis from the surface, closest to the image side, of the first lens unit to the aperture stop at the wide angle end, Lspmax is a maximum value of a distance on the optical axis from the surface, closest to the image side, of the first lens unit to the aperture stop, f1 is a focal length of the first lens unit, and fm is a combined focal length of the one or two moving lens units at the wide angle end.

9. The zoom lens according to claim 8, wherein
the first lens unit includes a negative first sub lens unit, a positive second sub lens unit, and a positive sub lens unit in order from the object side to the image side,
an interval between each pair of sub lens units adjacent to each other changes for focusing, and
at least the second sub lens unit moves for focusing.

10. The zoom lens according to claim 8, wherein a following conditional expression is satisfied:

$$|1/\beta p|<0.2,$$

where $\beta p$ is a lateral magnification of the positive lens unit at the wide angle end in a case where the zoom lens receives light from infinity.

11. The zoom lens according to claim 8, wherein a following conditional expression is satisfied:

$$1.05<Lspt/Lspw<1.75,$$

where Lspt is a distance on the optical axis from the surface, closest to the image side, of the first lens unit to the aperture stop at a telephoto end.

12. The zoom lens according to claim 8, wherein a following conditional expression is satisfied:

$$0.15<Mmax/L1<1.00,$$

where Mmax is a maximum value of an amount of movement of the one or two moving lens units for zooming from the wide angle end to a telephoto end.

13. An image pickup apparatus comprising:
the zoom lens of claim 8; and
an image pickup element configured to pick up an image formed by the zoom lens.

* * * * *